(12) United States Patent
Weng et al.

(10) Patent No.: US 7,337,405 B2
(45) Date of Patent: Feb. 26, 2008

(54) MULTI-MODAL SYNCHRONIZATION

(75) Inventors: Jie Weng, Sunnyvale, CA (US); Li Gong, San Francisco, CA (US); Samir Raiyani, Sunnyvale, CA (US); Vinod Guddad, Chico, CA (US); Richard J. Swan, Portola Valley, CA (US); Hartmut K. Vogler, Foster City, CA (US)

(73) Assignee: SAP Aktiengesellschaft, Walldorf (DE)

( * ) Notice: Subject to any disclaimer, the term of this patent is extended or adjusted under 35 U.S.C. 154(b) by 768 days.

(21) Appl. No.: 10/358,665

(22) Filed: Feb. 6, 2003

(65) Prior Publication Data
US 2003/0174155 A1 Sep. 18, 2003

Related U.S. Application Data

(63) Continuation-in-part of application No. 10/305,267, filed on Nov. 27, 2002, and a continuation-in-part of application No. 10/184,069, filed on Jun. 28, 2002, and a continuation-in-part of application No. 10/157,030, filed on May 30, 2002, and a continuation-in-part of application No. 10/131,216, filed on Apr. 25, 2002.

(60) Provisional application No. 60/354,324, filed on Feb. 7, 2002, provisional application No. 60/383,775, filed on May 30, 2002.

(51) Int. Cl.
*G06F 3/00* (2006.01)
*G06F 9/00* (2006.01)
*G06F 17/00* (2006.01)

(52) U.S. Cl. .................. 715/748; 715/500.1; 715/727; 715/760; 709/246

(58) Field of Classification Search ................ 715/727, 715/762, 760, 748, 500.1; 709/217, 246
See application file for complete search history.

(56) References Cited

U.S. PATENT DOCUMENTS 5,734,910 A 3/1998 Corrigan et al. ............ 710/261

(Continued)

FOREIGN PATENT DOCUMENTS

EP 1 100 013 A2 5/2001

OTHER PUBLICATIONS

Michael Classen, "The Voice of XML," Jun. 2001, printed from http://www.webreference.com (13 pages).

(Continued)

*Primary Examiner*—Tadesse Hailu
*Assistant Examiner*—Anita Datta Chaudhuri
(74) *Attorney, Agent, or Firm*—Fish & Richardson P.C.

(57) ABSTRACT

A system for synchronizing multiple modalities is described. A user may use multiple modalities, such as voice and browser, to interact with data on a network, such as the World Wide Web. All of the modalities may be synchronized so that all are updated when the user enters information in just one. A method of communicating between devices includes receiving a request for first-modality data that includes first content, and sending a message in response to receiving the request, the message including information allowing the request of second-modality data that includes second content overlapping the first content. Another method includes requesting first data for a first modality, the first data including first content, and automatically requesting second data for a second modality, wherein the second data includes second content that overlaps the first content.

28 Claims, 20 Drawing Sheets

U.S. PATENT DOCUMENTS

| | | | |
|---|---|---|---|
| 5,945,989 | A | 8/1999 | Freishtat et al. ............ 715/760 |
| 6,012,030 | A | 1/2000 | French-St. George et al. .......................... 704/270 |
| 6,119,147 | A | 9/2000 | Toomey et al. ............. 709/204 |
| 6,173,266 | B1 | 1/2001 | Marx et al. ................. 704/270 |
| 6,324,511 | B1 | 11/2001 | Kiraly et al. |
| 6,330,539 | B1 | 12/2001 | Takayama et al. .......... 704/275 |
| 6,363,393 | B1 | 3/2002 | Ribitzky ..................... 707/102 |
| 6,377,913 | B1 | 4/2002 | Coffman et al. ............... 704/8 |
| 6,501,832 | B1 | 12/2002 | Saylor et al. ............ 379/88.04 |
| 6,513,063 | B1 | 1/2003 | Julia et al. .................. 709/219 |
| 6,523,061 | B1 | 2/2003 | Halverson et al. .......... 709/202 |
| 6,801,604 | B2* | 10/2004 | Maes et al. .............. 379/88.17 |
| 2001/0049603 | A1 | 12/2001 | Sravanapudi et al. |
| 2002/0184373 | A1* | 12/2002 | Maes ......................... 709/228 |
| 2003/0046316 | A1* | 3/2003 | Gergic et al. ............... 707/513 |
| 2003/0071833 | A1* | 4/2003 | Dantzig et al. ............. 345/700 |
| 2003/0088421 | A1* | 5/2003 | Maes et al. .............. 704/270.1 |
| 2003/0126330 | A1* | 7/2003 | Balasuriya .................. 710/107 |
| 2003/0140113 | A1* | 7/2003 | Balasuriya .................. 709/217 |
| 2005/0273759 | A1* | 12/2005 | Lucassen et al. ........... 717/105 |
| 2006/0041431 | A1* | 2/2006 | Maes ...................... 704/270.1 |
| 2006/0101147 | A1* | 5/2006 | Balasuriya .................. 709/227 |
| 2006/0106935 | A1* | 5/2006 | Balasuriya .................. 709/227 |
| 2006/0168095 | A1* | 7/2006 | Sharma et al. .............. 709/217 |

OTHER PUBLICATIONS

Just van den Broecke, "Pushlets: Send events from servlets to DHTML client browsers," Mar. 2000, printed from http://www.JavaWorld.com (15 pages).

Nuance Communications Inc., "Nuance 8.0 Delivers Lower Costs for Enterprises and Service Providers, Boosts Customer Satisfaction with Superior Accuracy and Personalized Caller Interactions," Jan. 2002, printed from http://www.nuance.com (4 pages).

Nuance Communications Inc., "Nuance Backs W3C for Multi-Modal Applications Standard Setting," Feb. 2002, printed from http://www.nuance.com (2 pages).

Speech Application Language Tags ("SALT") Forum, "Cisco, Comverse, Intel, Microsoft, Philips and SpeechWorks Found Speech Application Language Tags Forum to Develop New Standard For Multimodal and Telephony-Enabled Applications and Services," Oct. 2001, printed from http://www.saltforum.org (5 pages).

Speech Application Language Tags ("SALT") Forum, "The SALT Forum Welcomes Additional Technology Leaders as Contributors," Jan. 2002, printed from http://www.saltforum.org (4 pages).

Jonathan Eisenzopf, "Microsoft-led SALT Forum Releases Draft Spec," 2002, printed from http://voicexmlplanet.com/articles/saltspec.html (4 pages).

Jupitermedia Corporation, "KnowNow Debuts with Event Routing Technology," Jun. 2001, printed from http://siliconvalley.internet.com/news/print.php/793671 (2 pages).

KnowNow, Inc., "Library Listing," 2002, printed from htt/://www.knownow.com (1 page).

KnowNow, Inc., "Event Routing vs. Multicasting: Marrying Publish-Subscribe and Internet-Style Routing," 2002, printed from htt/://www.knownow.com (3 pages).

KnowNow, Inc., "Web-Standard Messaging: Using Message Routing for Fast, Simple and Affordable Integration," 2002, printed from htt/://www.knownow.com (4 pages).

KnowNow, Inc., "KnowNow Architecture Overview," 2002, printed from htt/://www.knownow.com (5 pages).

ScanSoft, Inc., Product Listings and Descriptions for Dragon Naturally Speaking and PDsay, 2002, printed from http://www.scansoft.com/ (8 pages).

Hewlett-Packard Company, Cascaded Support Pages, 2002, printed from http://welcome.hp.com/ and linked pages (5 pages).

Hewlett-Packard Company, Customizing an Order with Pull-Down Menus, 2002, printed from http://www.hp.com and linked pages (3 pages).

Amazon.com, Inc., Search Menu for Books, 2002, printed from http://www.amazon.com (2 pages).

Dell Computer Corporation, "Dell Express Path II, Computer Finder," 2002, printed from http://www.dell.com and linked pages (2 pages).

Compaq, "Customize Your Configuration," 2002, printed from http://athome.compaq.com/ and linked pages (5 pages).

Andrew Hunt (editor), "JSpeech Grammar Format," Jun. 2000, printed from http://www.w3.org/TR/2000/NOTE-jsgf-20000605 (31 pages).

Michael Riben, M.D, Speech Recognition Tutorial, Jan. 1999, printed from http://home.nycap.rr.com/voice (50 pages).

Paaso et al., "A New Environment for Courseware Development, Course Delivery and Training", Proceedings of the ED-Media 97.

Henze et al., "Modeling Constructivist Teaching Functionality and Structure in the KBS Hyperbook System", Jun. 1999.

Jungmann et al., Adaptive Hypertext in Complex Information Spaces, Mar. 1997.

Max Muhlhauser, "Cooperative Computer-Aided Authoring and Learning" 1995, Kluwer Academic Publishers.

Wyard et al., "Spoken Language systems—beyond prompt and response," *BT Technology Journal*, 1996, 14(1): 187-205.

\* cited by examiner

MULTI-MODAL SYNCHRONIZATION

CROSS-REFERENCE TO RELATED APPLICATIONS

This application claims priority from (i) U.S. Provisional Application No. 60/354,324, filed Feb. 7, 2002, titled "Mobile Application Architecture," and (ii) U.S. Provisional Application No. 60/383,775, filed May 30, 2002, titled "Dynamic Grammar with Visual Clues for Voice-Enabled Mobile Applications," each of which is hereby incorporated by reference in its entirety for all purposes. This application claims priority from and is a continuation-in-part of (i) U.S. application Ser. No. 10/131,216, filed Apr. 25, 2002, titled "Multi-Modal Synchronization," (ii) U.S. application Ser. No. 10/157,030, filed May 30, 2002, titled "User Interface for Data Access and Entry," (iii) U.S. application Ser. No. 10/184,069, filed Jun. 28, 2002, titled "User Interface for Data Access and Entry" and (iv) U.S. application Ser. No. 10/305,267, filed Nov. 27, 2002, titled "Dynamic Grammar for Voice-Enabled Applications," each of which is hereby incorporated by reference in its entirety for all purposes.

TECHNICAL FIELD

Particular implementations relate generally to synchronization of multiple modes of communication, and more particularly to such synchronization as applied to mobile devices.

BACKGROUND

A user may interface with a machine in many different modes, such as, for example, a mechanical mode, an aural mode, and a visual mode. A mechanical mode may include, for example, using a keyboard for input. An aural mode may include, for example, using voice input or output. A visual mode may include, for example, using a display output. When using a computer to access data over the World-Wide Web ("WWW") a browser may be used. A browser generally allows a keyboard, a mouse, or a stylus to be used for input and a display to be used for output. Alternatively, voice input and output can be used to access data over the WWW.

SUMMARY

In one aspect, communicating between devices includes receiving a request for first-modality data that includes first content. The first-modality data is configured to be presented using a first modality. The request comes from a requestor and is received at a first device. In response to receiving the request, the first device sends a message for receipt by a second device. The message includes information allowing the second device to request second-modality data that includes second content that overlaps the first content. The second-modality data is configured to be presented using a second modality. The first-modality data and the second-modality data may be synchronized by presenting the first-modality data and the second-modality data to a user such that the user may respond to the overlapping content using either the first modality or the second-modality.

The information that is to be sent in the message may be determined. The information may include a pointer to the second-modality data or to the first-modality data. The information may include a first pointer that points to a second pointer that points to the second-modality data.

The first-modality data and the second-modality data may be presented during, for example, an overlapping time period. The first-modality data may be presented to a first user at a first mobile device; the second-modality data may be presented to a second user at a second mobile device; and either the first user or the second user may respond to the overlapping content.

Sending the message may include publishing the message on a channel in a publish/subscribe system to which the second device has already been subscribed. The channel may be identified by an Internet Protocol ("IP") address of a user device, by an identifier of a user device, or by an identifier of a user that is using the first modality and the second modality.

The first device may include a browser; the first-modality data may include a hypertext markup language ("HTML") page; the requestor may include a user; the browser may send the message using a browser adaptor; the second device may include a voice gateway including a voice gateway adaptor; and the second-modality data may include an indicator of a voice extensible markup language ("VXML") page that corresponds to the HTML page. The indicator of the VXML page may include a uniform resource locator ("URL") of the VXML page, or a URL of the HTML page.

The first device may include a voice gateway; the first-modality data may include a VXML page; the requestor may include a voice-over-IP ("VoIP") client on a user device; the voice gateway may send the message using a voice gateway adaptor; the second device may include a browser including a browser adaptor; and the second-modality data may include an indicator of a HTML page that corresponds to the VXML page. The requestor may include a feature extraction unit on a user device. The channel may be identified by an identifier of a user.

The first device may include a server; the first-modality data may include a HTML page; the requestor may include a browser including a browser adaptor; the server may receive the request from the browser; the second device may include a voice gateway including a voice gateway adaptor; and the second-modality data may include an indicator of a VXML page that corresponds to the HTML page. The server may receive the request from the browser through an intermediary selected from a group consisting of a firewall, a proxy, and a gateway.

The first device and the second device may be part of a network that provides access to data from a remote location. The first device may include a device selected from a group consisting of (i) a gateway, (ii) an adaptor, and (iii) a server. The requestor may include an entity selected from a group consisting of (i) a user, (ii) a personal communications device, (iii) a gateway, and (iv) an adaptor. The requestor may include the second device.

Another request may be received at the first device. The other request may come from a second requester and request second first-modality data that includes third content. The second first-modality data may be configured to be presented using the first modality. In response to receiving the other request, the first device may send another message. The other message may be sent for receipt by a third device. The other message may include second information allowing the third device to request second second-modality data that includes fourth content that overlaps the third content. The second second-modality data may be configured to be presented using the second modality.

The second first-modality data and the second second-modality data may be synchronized by presenting the second first-modality data and the second second-modality data to a second user such that the second user may respond to the overlapping content using either the first modality or the second modality.

The first device may include a server; the requestor may include a first browser; the second device may include a first voice gateway including a first voice gateway adaptor; the second requestor may include a second voice gateway including a second voice gateway adaptor; and the third device may include a second browser.

The first device may send a second message in response to receiving the initial request, and the second message may be sent for receipt by a third device. The second message may include second information allowing the third device to request third-modality data that includes third content that overlaps both the first content and the second content. The third-modality data may be configured to be presented using a third modality.

The first-modality data, the second-modality data, and the third-modality data may be synchronized by presenting each to the user such that the user may respond to the overlapping content using either the first modality, the second modality, or the third modality. Sending the message and sending the second message may be performed by sending a single message for receipt by both the second device and the third device. The information may include the second information.

The first-modality data may be sent to the requestor. A request for the second-modality data may be received from the second device. The second-modality data may be sent to the second device. The requester may include a gateway; the first device may include a server; and the second device may include another gateway.

A communication device may include one or more components or mechanisms for performing one or more of the above implementations. A component or mechanism for receiving the request may include a gateway including a gateway adaptor. A component or mechanism for sending the message may include the gateway adaptor. A component or mechanism for receiving the request may include a server including a server adaptor. A component or mechanism for sending the message may include the server adaptor.

In another aspect, first data for a first modality is requested. The first data includes first content. After requesting the first data, second data for a second modality is automatically requested. The second data includes second content that overlaps the first content. The first modality may be synchronized with the second modality by presenting the first content and the second content to a user such that the user may respond to the overlapping content using either the first modality or the second modality.

The first content may be presented to a user using the first modality. The second content may be presented to the user using the second modality. And the first content and the second content may be presented to the user in an overlapping time period in which the user may respond to the overlapping content using either the first modality or the second modality.

In another aspect, a communication device includes a first-modality user interface coupled to a first gateway. The first-modality user interface is configured to request first data including first content for a first modality, and to present to a user the first content using the first modality. The communication device includes a second gateway configured to automatically request second data for a second modality after the first-modality user interface requests the first data. The second data includes second content that overlaps the first content. The communication device further includes a second-modality user interface configured to present to the user the second content using the second modality.

The communication device may be configured to present to the user the first content and the second content such that the user may respond to the overlapping content using either the first modality or the second modality. A synchronization module may be coupled to the first-modality user interface and the second gateway. The synchronization module may be configured to determine the second data to be requested based on the first data.

In another aspect, presenting updated data in different modalities includes presenting content using a first modality and a second modality. An input is received from the first modality in response to presenting the content. In response to receiving the input, new content is automatically presented using the first modality and the second modality, and the new content is determined based on the received input.

Presenting the new content using the second modality may include determining, based on the received input, a second-modality data item that includes the new content. The content may be presented using the first modality in a first time period, and the content may be presented using the second modality in a second time period that overlaps the first time period.

An apparatus may include a computer readable medium having instructions stored thereon that when executed result in one or more of the above implementations of any of the above aspects. The apparatus may include a processing device coupled to the computer readable medium for executing instructions stored thereon.

A communication device may include one or more components or mechanisms for performing one or more of the above implementations of any of the above aspects.

The details of one or more implementations are set forth in the accompanying drawings and the description below. Other features of particular implementations will be apparent from the description, the drawings, and the claims.

DETAILED DESCRIPTION

Introduction to a Particular Implementation

In one particular implementation, which is discussed more fully with respect to FIG. 2 below, a user may use multiple communication modes to interface with the WWW. For example, a user may use a browser and, at the same time, use aural input and output. The aural interface and the browser can be synchronized so as to allow the user to choose whether to use the browser or voice for a particular input. The implementation may remain synchronized by updating both the browser and a voice gateway with corresponding data. For example, when a user clicks on a link, the browser will display the desired web page and the voice gateway will receive the corresponding voice-based web page so that the user can receive voice prompts corresponding to the displayed page and enter voice input corresponding to the displayed page.

Centralized Implementations

Figure 1:
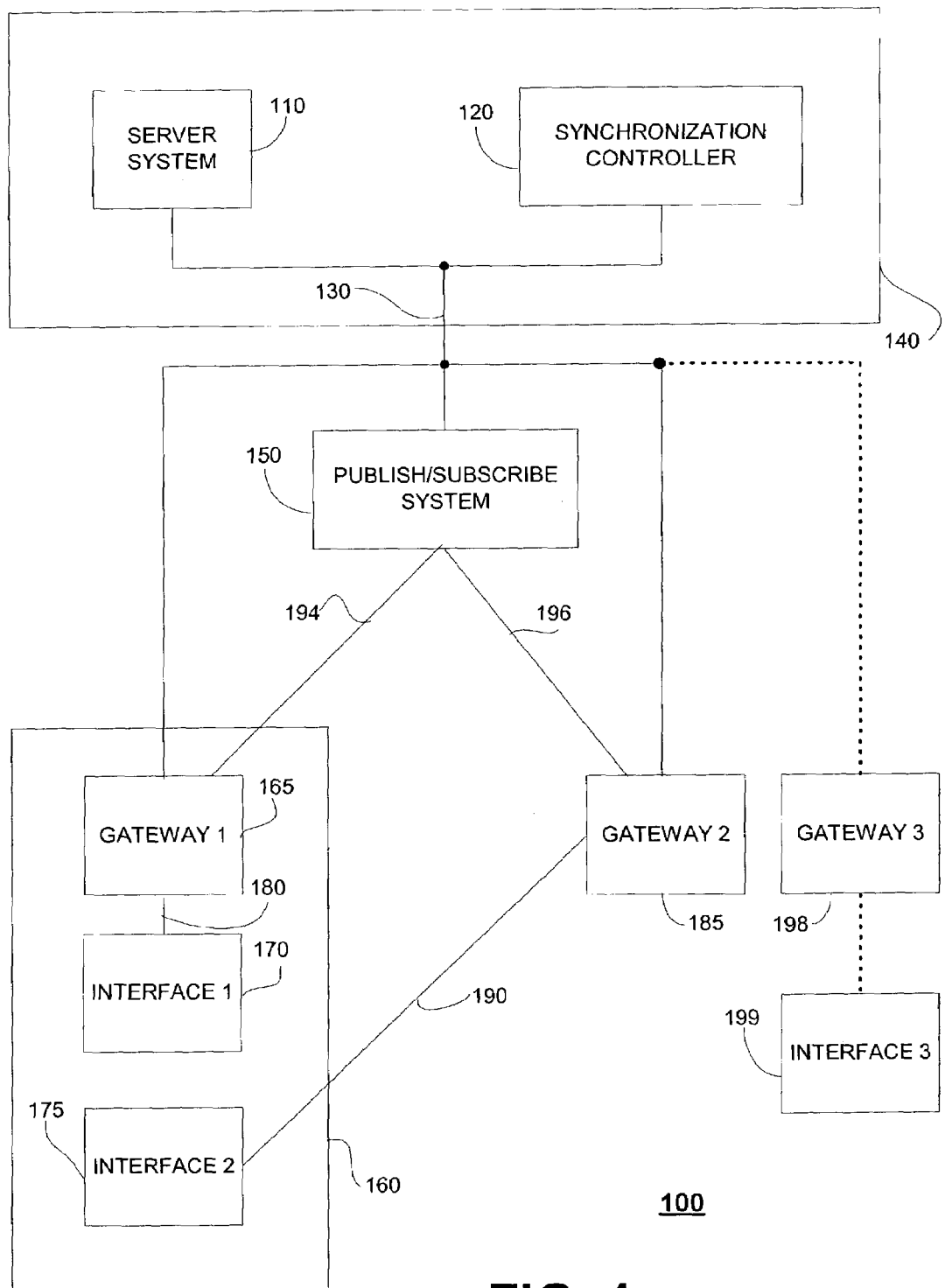
FIG. 1 is an example of a centralized system for synchronizing multiple communication modes.

Referring to FIG. 1, a system 100 for synchronizing multiple communication modes includes a server system 110 and a synchronization controller 120 that communicate with each other over a connection 130 and are included in a common unit 140. The server system 110 and/or the synchronization controller 120 communicate with a publish/subscribe system 150 over the connection 130.

The system 100 also includes a device 160 that includes a first gateway 165, a first interface 170, and a second interface 175. The first gateway 165 and the first interface 170 communicate over a connection 180. The system 100 also includes a second gateway 185 that communicates with the second interface 175 over a connection 190. Either or both of the first and second gateways 165 and 185 communicate with either the server system 110 and/or the synchronization controller 120 over the connection 130. The first and second gateways 165 and 185 also communicate with the publish/subscribe system 150 over connections 194 and 196, respectively.

An "interface" refers to a component that either accepts input from a user or provides output to a user. Examples include a display, a printer, a speaker, a microphone, a touch screen, a mouse, a roller ball, a joystick, a keyboard, a temperature sensor, a light sensor, a light, a heater, an air quality sensor such as a smoke detector, and a pressure sensor. A component may be, for example, hardware, software, or a combination of the two.

A "gateway" refers to a component that translates between user input/output and some other data format. For example, a browser is a gateway that translates the user's clicks and typing into hypertext transfer protocol ("HTTP") messages, and translates received HTML messages into a format that the user can understand.

The system 100 optionally includes a third gateway 198 and a third interface 199. The third gateway optionally communicates directly with the unit 140 over the connection 130. The third gateway 198 represents the multiplicity of different modes that may be used in different implementations, and the fact that the gateways and interfaces for these modes may be remote from each other and from the other gateways and interfaces. Examples of various modes of input or output include manual, visual (for example, display or print), aural (for example, voice or alarms), haptic, pressure, temperature, and smell. Manual modes may include, for example, keyboard, stylus, keypad, button, mouse, touch (for example, touch screen), and other hand inputs.

A modality gateway or a modality interface refers to a gateway (or interface) that is particularly adapted for a specific mode, or modes, of input and/or output. For example, a browser is a modality gateway in which the modality includes predominantly manual modes of input (keyboard, mouse, stylus), visual modes of output (display), and possibly aural modes of output (speaker). Thus, multiple modes may be represented in a given modality gateway. Because a system may include several different modality gateways and interfaces, such gateways and interfaces are referred to as, for example, a first-modality gateway, a first-modality interface, a second-modality gateway, and a second-modality interface.

More broadly, a first-modality entity refers to a component that is particularly adapted for a specific mode, or modes, of input and/or output. A first-modality entity may include, for example, a first-modality gateway or a first-modality interface.

A first-modality data item refers to a data item that is used by a first-modality entity. The data item need not be provided in one of the modes supported by the first-modality entity, but rather, is used by the first-modality entity to interface with the user in one of the supported modes. For example, if a voice gateway is a first-modality gateway, then a first-modality data item may be, for example, a VXML page. The VXML page is not itself voice data, but can be used to provide a voice interface to a user.

Figure 2:
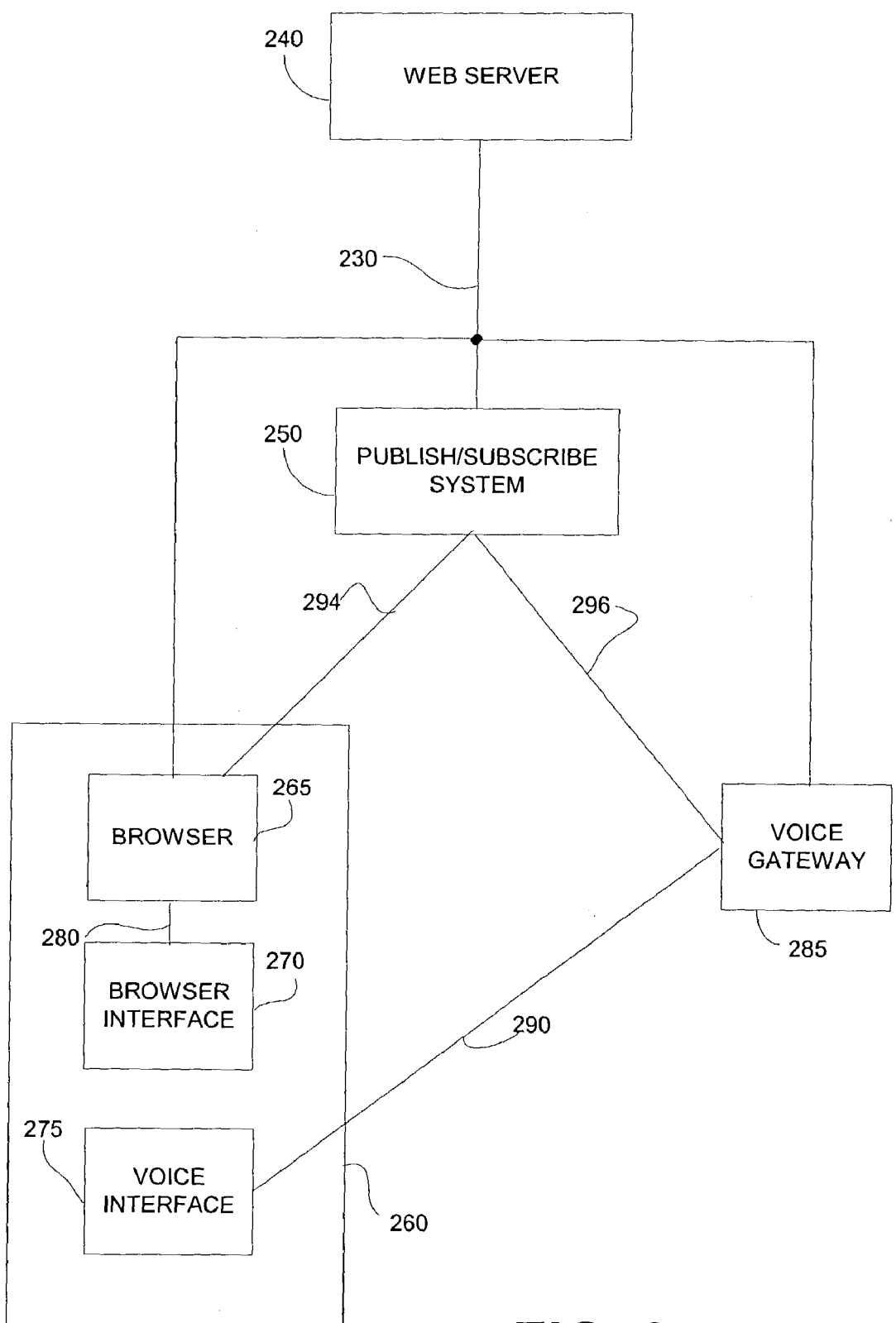
FIG. 2 is an example of an implementation of the system of FIG. 1.

Referring to FIG. 2, a system 200 is one example of an implementation of the system 100. The control unit 140 is implemented with a web server 240 that includes a built-in synchronization controller. The device 160 is implemented by a device 260 that may be, for example, a computer or a mobile device. The first gateway 165 and the first interface 170 are implemented by a browser 265 and a browser interface 270, respectively, of the device 260. The second gateway 185 and the second interface 175 are implemented by a voice gateway 285 and a voice interface 275, respectively. A publish/subscribe system 250 is analogous to the publish/subscribe system 150. Connections 230, 280, 290, 294, and 296 are analogous to the connections 130, 180, 190, 194, and 196.

The voice interface 275 may include, for example, a microphone and a speaker. The voice interface 275 may be used to send voice commands to, and receive voice prompts from, the voice gateway 285 over the connection 290. The commands and prompts may be transmitted over the connection 290 using, for example, voice telephony services over an Internet protocol ("IP") connection (referred to as voice over IP, or "VoIP"). The voice gateway 285 may perform the voice recognition function for incoming voice data. The voice gateway 285 also may receive from the web server 240 VXML pages that include dialogue entries for interacting with the user using voice. The voice gateway 285 may correlate recognized words received from the user with the dialogue entries to determine how to respond to the user's input. Possible responses may include prompting the user for additional input or executing a command based on the user's input.

The browser 265 operates in an analogous manner to the voice gateway 285. However, the browser 265 uses HTML pages rather than VXML pages. Also, the browser 265 and the user often communicate using manual and visual modes such as, for example, a keyboard, a mouse and a display, rather than using voice. Although the browser 265 may be capable of using an aural mode, that mode is generally restricted to output, such as, for example, providing music over a speaker. Although the system 200 shows an implementation tailored to the modes of manual and voice input, and display and voice output, alternative and additional modes may be supported.

The publish/subscribe system 250 may function, for example, as a router for subscribed entities. For example, if the gateways 265 and 285 are subscribed, then the publish/subscribe system 250 may route messages from the web server 240 to the gateways 265 and 285.

The operation of the system 200 is explained with reference to FIGS. 3-6, which depict examples of processes that may be performed using the system 200. Four such processes are described, all dealing with synchronizing two gateways after a user has navigated to a new page using one of the two gateways. The four processes are server push, browser pull, voice-interrupt listener, and no-input tag.

Figure 3:
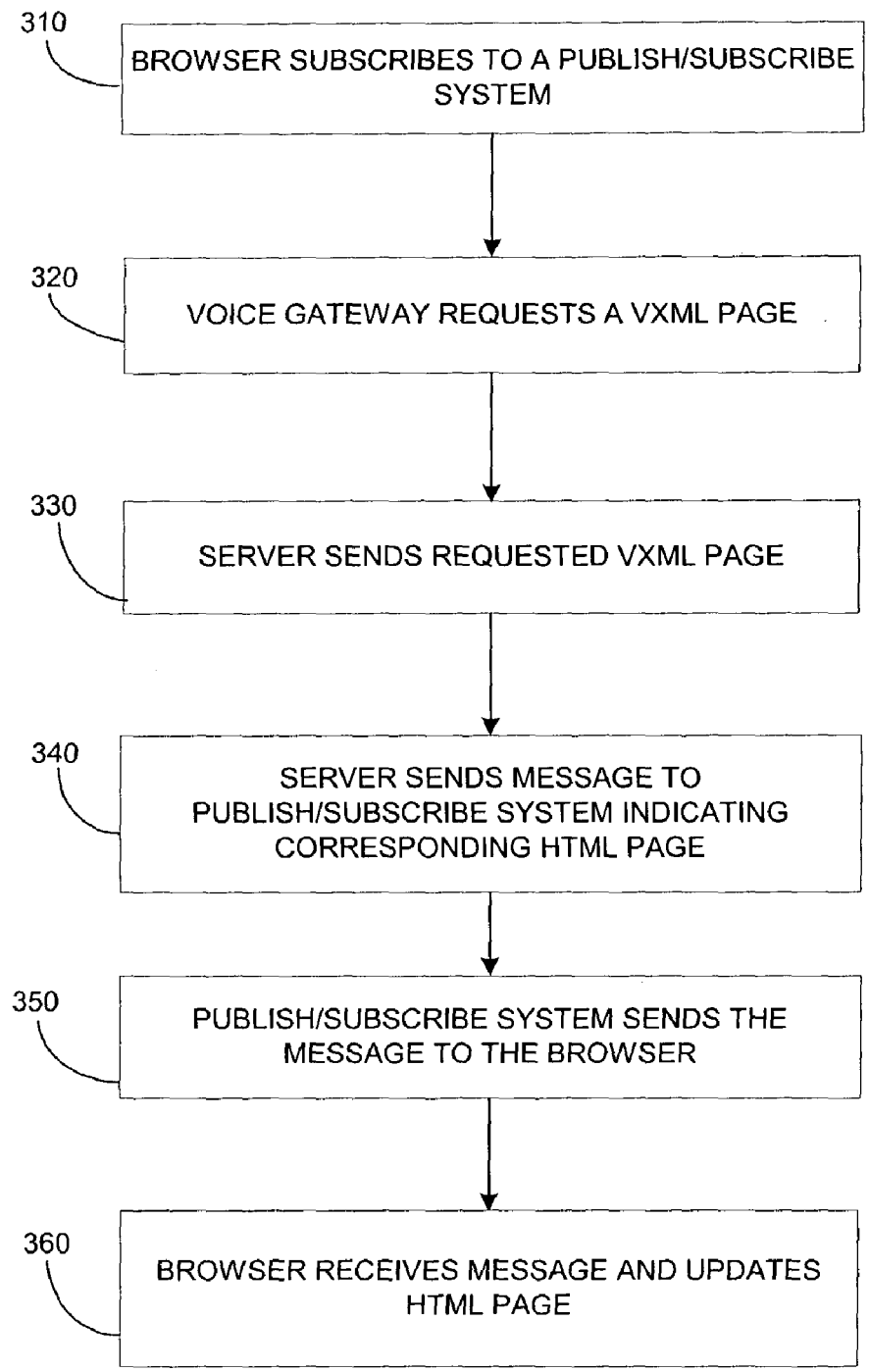
FIG. 3 is an example of a server-push process for synchronizing a browser after a voice gateway requests a VXML page.

Referring to FIG. 3, a process 300, referred to as server push, for use with the system 200 includes having the browser 265 subscribe to the publish/subscribe system 250 (310). Subscription may be facilitated by having the web server 240 insert a function call into a HTML page. When the browser 265 receives and loads the page, the function call is executed and posts a subscription to the publish/subscribe system 250. The subscription includes a call-back pointer or reference that is inserted into the subscription so that, upon receiving a published message, the publish/subscribe system 250 can provide the message to the browser 265. After subscribing, the browser 265 then listens to the publish/subscribe system 250 for any messages. In one implementation, the browser 265 uses multiple frames including a content frame, a receive frame, and a send frame. The send frame is used to subscribe; the receive frame is used to listen; and the content frame is the only frame that displays content. Subscription (310) may be delayed in the process 300, but occurs before the browser 265 receives a message (see 350).

The process 300 includes having the voice gateway 285 request a VXML page (320), and having the web server 240 send the VXML page to the voice gateway 285 (330). Note that the browser 265 and the voice gateway 285 are the gateways to be synchronized in the implementation of the process 300 being described. The operations 320 and 330 may be initiated, for example, in response to a user's provision of a voice command to the voice gateway 285 to tell the voice gateway 285 to navigate to a new web page. The web server 240 may delay sending the VXML page until later in the process 300. Such a delay might be useful to better time the arrival of the requested VXML page at the voice gateway 285 with the arrival of the corresponding HTML page at the browser 265.

A page may be, for example, a content page or a server page. A content page includes a web page, which is what a user commonly sees or hears when browsing the web. Web pages include, for example, HTML and VXML pages. A server page includes a programming page such as, for example, a Java Server Page ("JSP"). A server page may also include content.

The process 300 includes having the web server 240 send a message to the publish/subscribe system 250 to indicate the HTML page that corresponds to the VXML page sent to the voice gateway 285 (340). The web server 240 may recognize, or perhaps assume, that the voice gateway 285 and the browser 265 are out of synchronization, or that the two gateways 265 and 285 will become out of synchronization due to the VXML page being sent to the voice gateway 285. Accordingly, the web server 240 sends the message to the publish/subscribe system 250, intended for the browser 265, to bring the two gateways 265 and 285 into synchronization. The web server 240 may send the message by using, for example, a HTTP post message with an embedded JavaScript command that indicates the corresponding HTML page. The web server 240 need not designate the particular browser 265 for which the message is intended (by, for example, specifying an IP address and a port number). Rather, the web server 240 sends a message configured for a specific "topic" (usually a string parameter). All subscribers to that topic receive the message when the message is published by the web server 240 using the publish/subscribe system 250.

The web server 240 may determine the corresponding HTML page in a variety of ways. For example, if the VXML page request was the voice equivalent of a click on a link, then the VXML data may contain the uniform resource locator ("URL") for the corresponding HTML page. Alternatively, for example, the web server 240 may access a database containing URLs of corresponding VXML and HTML pages, or perform a URL translation if the corresponding pages are known to have analogous URLs.

"Synchronizing," as used in this disclosure, refers to bringing two entities into synchronization or maintaining synchronization between two entities. Two gateways are said to be synchronized, for the purposes of this disclosure, when, at a given point in time, a user can use either of the two gateways to interface with the same specific information, the interfacing including either input or output.

Two items "correspond," as used in this disclosure, if they both can be used by a different modality gateway to allow a user to interface with the same specific information. For example, an HTML page corresponds to a VXML page if the HTML page and the VXML page allow the user to interface with the same information. An item may correspond to itself if two gateways can use the item to allow a user to interface with information in the item using different modalities.

The process 300 includes having the publish/subscribe system 250 receive the message from the web server 240 and send the message to the browser 265 (350). The publish/subscribe system 250 may use another HTTP post message to send the message to all subscribers of the specified topic. In such an implementation, the publish/subscribe system 250 may use a call-back pointer or reference that may have been inserted into the subscription from the browser 265.

The process 300 includes having the browser 265 receive the message (360). The browser 265 is assumed to be in a streaming HTTP mode, meaning that the HTTP connection is kept open between the browser 265 and the publish/subscribe system 250. Because the browser 265 is subscribed, a HTTP connection is also kept open between the publish/subscribe system 250 and the web server 240. The web server 240 repeatedly instructs the browser 265, through the publish/subscribe system 250, to "keep alive" and to continue to display the current HTML page. These "keep alive" communications are received by the receive frame of the browser 265 in an interrupt fashion. When the web server message arrives and indicates the corresponding HTML page, the browser 265 receives the message in the browser receive frame and executes the embedded JavaScript command. Executing the command updates the content frame of the browser 265 by redirecting the content frame to another HTML page.

Figure 4:
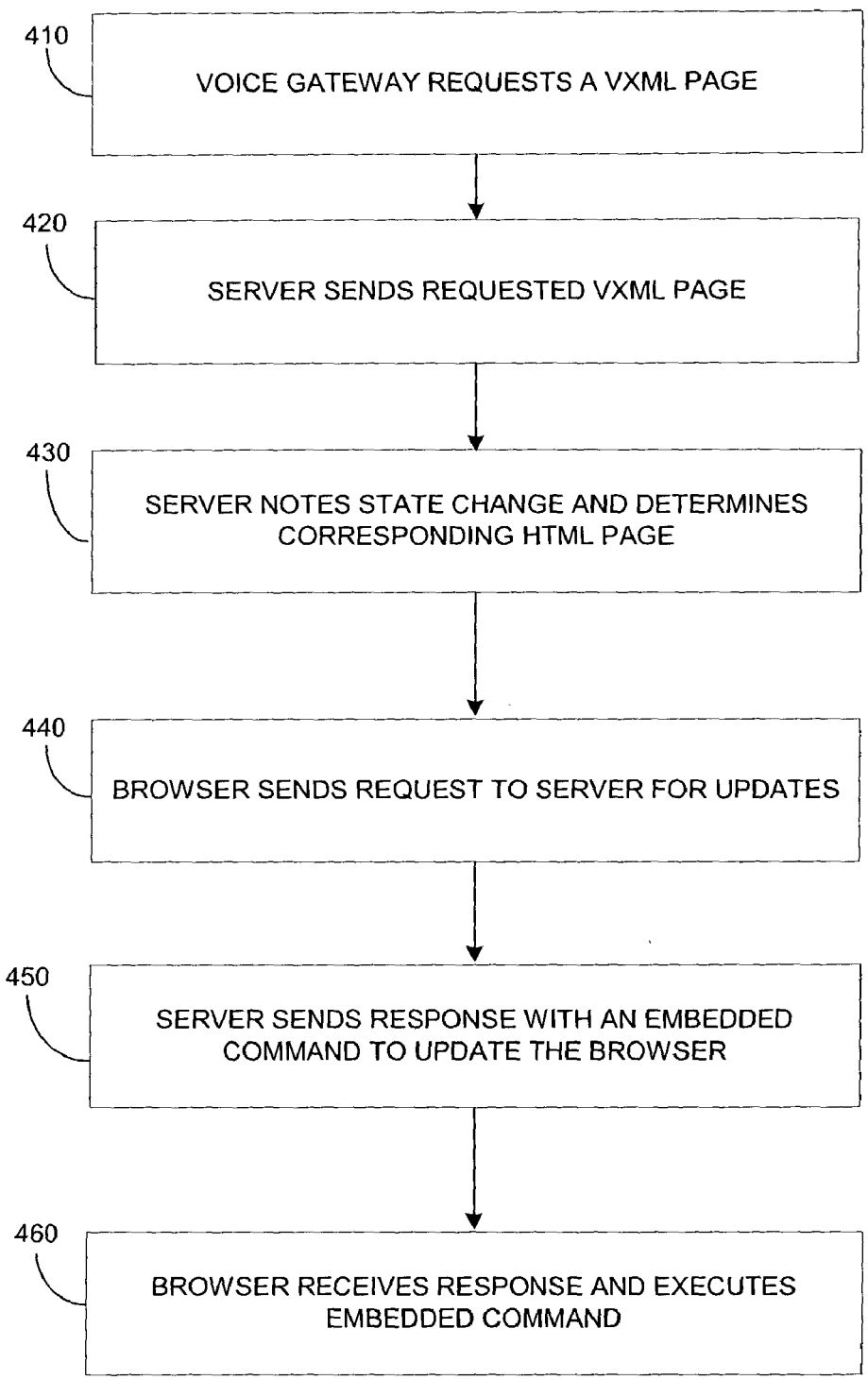
FIG. 4 is an example of a browser-pull process for synchronizing a browser after a voice gateway requests a VXML page.

Referring to FIG. 4, a process 400 for use with the system 200, which may be referred to as browser pull, includes having the voice gateway 285 request a VXML page (410), and having the web server 240 send the requested VXML page to the voice gateway 285 (420). The web server 240 may delay sending the VXML page until later in the process 400 in order, for example, to better time the arrival of the requested VXML page at the voice gateway 285 with the arrival of the corresponding HTML page at the browser 265.

The process 400 includes having the web server 240 note that the state of the voice gateway 285 has changed and determine the corresponding page that the browser 265 needs in order to remain synchronized (430). The web server 240 thus tracks the state of the gateways 265 and 285.

The process 400 includes having the browser 265 send a request to the web server 240 for any updates (440). The requests are refresh requests or requests for updates, and the browser 265 sends the requests on a recurring basis from a send frame using a HTTP get message.

The process 400 includes having the web server 240 send a response to update the browser 265 (450). Generally, the web server 240 responds to the refresh requests by sending a reply message to the browser receive frame to indicate "no change." However, when the voice gateway 285 has requested a new VXML page, the web server 240 embeds a JavaScript command in the refresh reply to the browser 265 that, upon execution by the browser 265, results in the browser 265 coming to a synchronized state. The JavaScript command, for example, instructs the browser 265 to load a new HTML page.

The process 400 includes having the browser 265 receive the response and execute the embedded command (460). Upon executing the embedded command, the browser 265 content frame is updated with the corresponding HTML page. The command provides the URL of the corresponding page. In another implementation, the web server 240 sends a standard response to indicate "no changes" and to instruct the browser 265 to reload the current HTML page from the web server 240. However, the web server 240 also embeds a command in the current HTML page on the web server 240, and the command indicates the corresponding HTML page. Thus, when the current HTML page is requested, received, and loaded, the browser 265 will execute the embedded command and update the HTML page.

Figure 5:
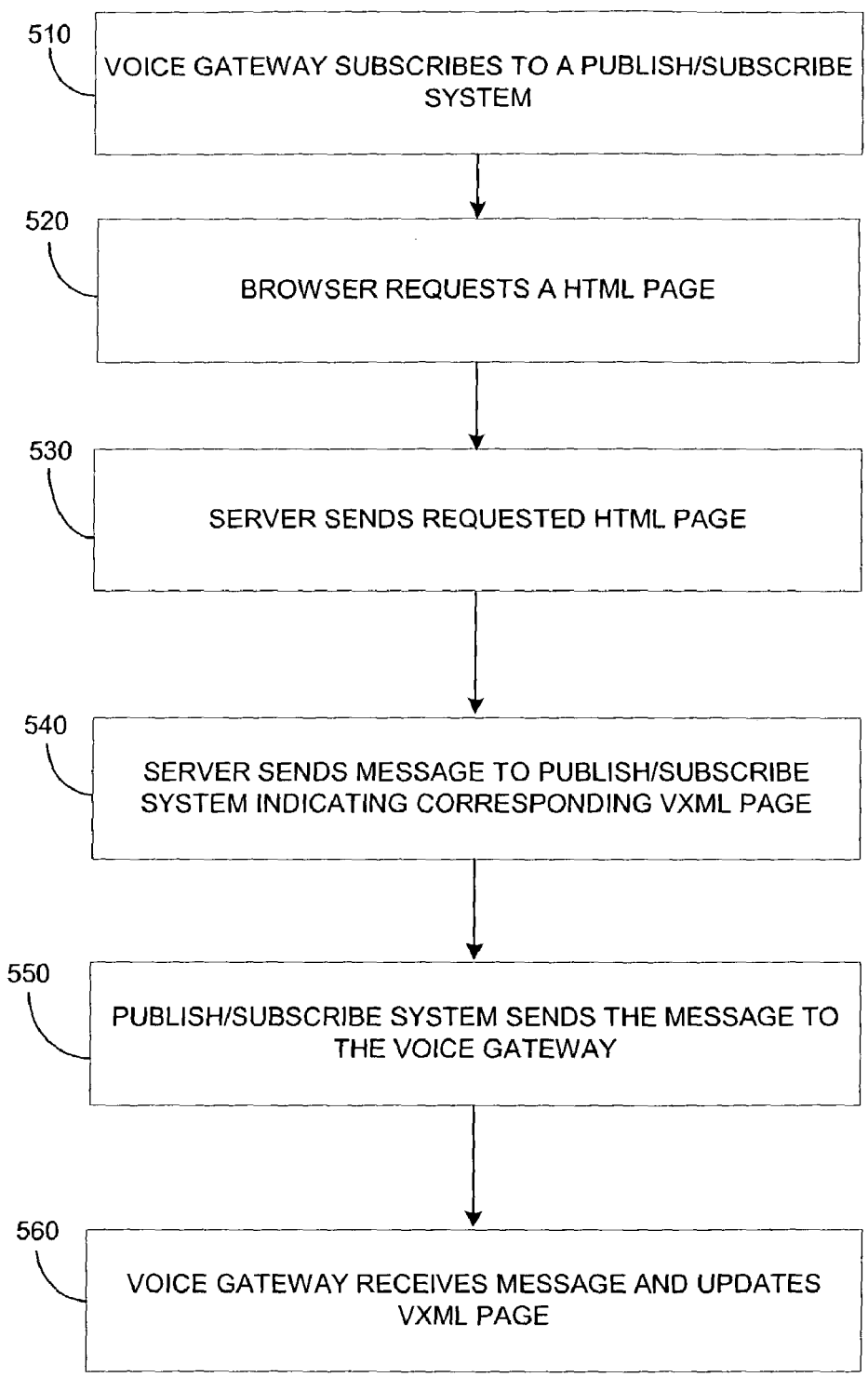
FIG. 5 is an example of a voice-interrupt listener process for synchronizing a voice gateway after a browser requests a HTML page.

Referring to FIG. 5, a process 500 for use with the system 200, which may be referred to as voice-interrupt listener, includes having the voice gateway 285 subscribe to the publish/subscribe system 250 (510). A function call may be embedded in a VXML page received from the web server 240, and the function call may be executed by the voice gateway 285 to subscribe to the publish/subscribe system 250. The voice gateway 285 can subscribe at various points in time, such as, for example, when the voice gateway 285 is launched or upon receipt of a VXML page. In contrast to a browser, the voice gateway does not use frames. Subscription (510) may be delayed in the process 500, but occurs before the voice gateway 285 receives a message (see 550).

The process 500 includes having the browser 265 request from the web server 240 a HTML page (520) and having the web server 240 send to the browser 265 the requested HTML page (530). This may be initiated, for example, by a user selecting a new URL from a "favorites" pull-down menu on the browser 265. The web server 240 may delay sending the requested HTML page (530) until later in the process 500 in order, for example, to better time the arrival of the requested HTML page at the browser 265 with the arrival of the corresponding VXML page at the voice gateway 285.

The process 500 includes having the web server 240 send a message to the publish/subscribe system 250 to indicate a corresponding VXML page (540). The web server 240 sends a HTTP post message to the publish/subscribe system 250, and this message includes a topic to which the voice gateway 285 is subscribed. The web server 240 also embeds parameters, as opposed to embedding a JavaScript command, into the message. The embedded parameters indicate the corresponding VXML page.

The process 500 includes having the publish/subscribe system 250 send the message to the voice gateway 285 (550). The publish/subscribe system 250 may simply reroute the message to the subscribed voice gateway 285 using another HTTP post message.

The process 500 also includes having the voice gateway 285 receive the message (560). The voice gateway 285 is assumed to be in a streaming HTTP mode, listening for messages and receiving recurring "keep alive" messages from the publish/subscribe system 250. When the voice gateway 285 receives the new message from the web server 240, the voice gateway 285 analyzes the embedded parameters and executes a command based on the parameters. The command may be, for example, a request for the corresponding VXML page from the web server 240.

Figure 6:
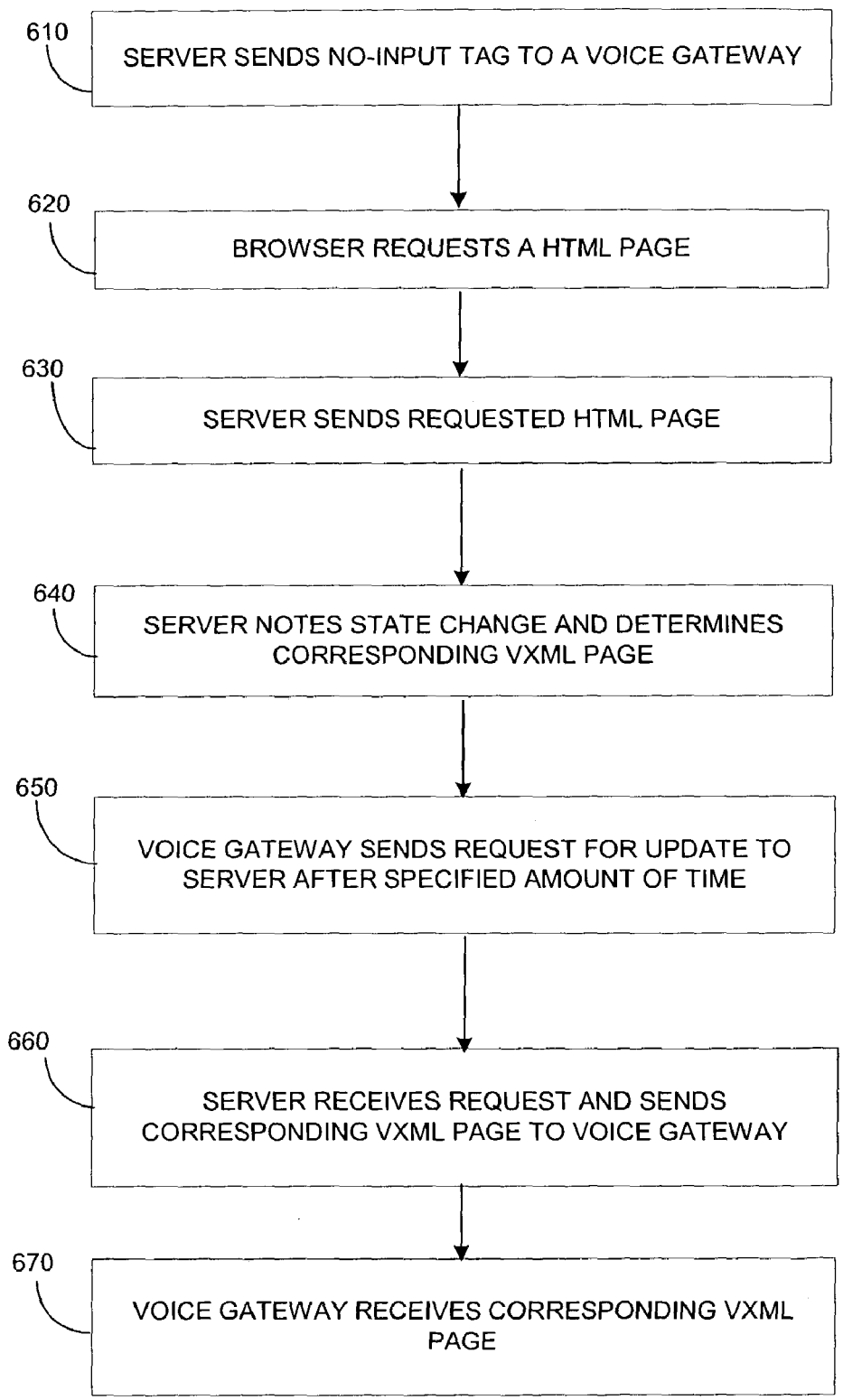
FIG. 6 is an example of a no-input tag process for synchronizing a voice gateway after a browser requests a HTML page.

Referring to FIG. 6, a process 600 for use with the system 200, which may be referred to as no-input tag, includes having the web server 240 send to the voice gateway 285 a VXML page with a no-input tag embedded (610). Every VXML page may have a no-input markup tag (<no input>) that specifies code on the voice gateway 285 to run if the voice gateway 285 does not receive any user input for a specified amount of time. The URL of a JSP (Java Server Page) is embedded in the code, and the code tells the voice gateway 285 to issue a HTTP get command to retrieve the JSP. The same no-input tag is embedded in every VXML page sent to the voice gateway 285 and, accordingly, the no-input tag specifies the same JSP each time.

The process 600 includes having the browser 265 request a HTML page (620), having the web server 240 send the requested HTML page to the browser 265 (630), and having the web server 240 note the state change and determine a corresponding VXML page (640). The web server 240 updates the contents of the JSP, or the contents of a page pointed to by the JSP, with information about the corresponding VXML page. Such information may include, for example, a URL of the corresponding VXML page. The web server 240 may delay sending the requested HTML page (630) until later in the process 600 in order, for example, to better time the arrival of the requested HTML page at the browser 265 with the arrival of the corresponding VXML page at the voice gateway 285.

The process 600 includes having the voice gateway 285 wait the specified amount of time and send a request for an update (650). After the specified amount of time, as determined by the code on the voice gateway 285, has elapsed, the voice gateway 285 issues a HTTP get command for the JSP. When no user input is received for the specified amount of time, the user may have entered input using a non-voice mode and, as a result, the voice gateway 285 may need to be synchronized.

The process 600 includes having the web server 240 receive the update request and send the corresponding VXML page to the voice gateway 285 (660). The JSP contains an identifier of the corresponding VXML page, with the identifier being, for example, a URL or another type of pointer. The web server 240 issues a HTTP post message to the voice gateway 285 with the VXML page corresponding to the current HTML page.

The process 600 includes having the voice gateway 285 receive the corresponding VXML page (670). When the voice gateway 285 receives and loads the corresponding VXML page, and the browser 265 receives and loads the HTML page (see 630), the two gateways 265 and 285 are synchronized. It is possible, however, that the two gateways 265 and 285 were never unsynchronized because the user did not enter a browser input, in which case the voice gateway 285 simply reloads the current VXML page after no voice input was received during the specified amount of waiting time.

The process 600 has an inherent delay because the process waits for the voice gateway 285 to ask for an update. It is possible, therefore, that the voice gateway 285 will be out of synchronization for a period of time on the order of the predetermined delay. A voice input received while the voice gateway 285 is out of synchronization can be handled in several ways. Initially, if the context of the input indicates that the gateways 265 and 285 are out of synchronization, then the voice input may be ignored by the voice gateway 285. For example, if a user clicks on a link and then speaks a command for a dialogue that would correspond to the new page, the voice gateway 285 will not have the correct dialogue. Assuming a conflict, however, the web server 240 may determine that the gateways 265 and 285 are not in synchronization and may award priority to either gateway. Priority may be awarded, for example, on a first-input basis or priority may be given to one gateway as a default.

Fused Implementations

Figure 7:
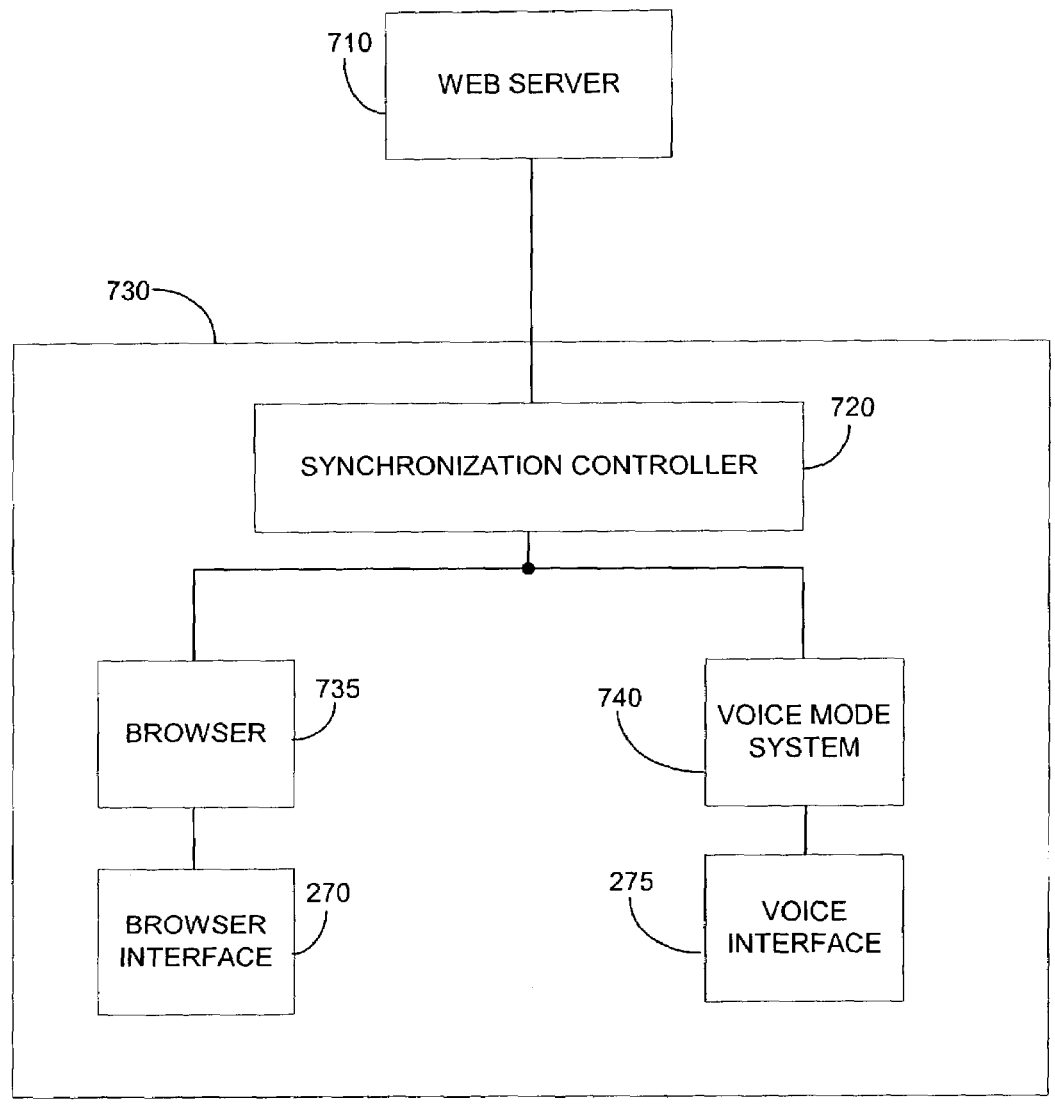
FIG. 7 is an example of a fused system for synchronizing multiple modes.

Referring to FIG. 7, a system 700 includes a web server 710 communicating with a synchronization controller 720 on a device 730. The device 730 also includes a browser 735 in communication with the browser interface 270, and a voice mode system 740 in communication with the voice interface 275.

The web server 710 may be, for example, a standard web server providing HTML and VXML pages over a HTTP connection. The device 730 may be, for example, a computer, a portable personal digital assistant ("PDA"), or other electronic device for communicating with the Internet. In one implementation, the device 730 is a portable device that allows a user to use either browser or voice input and output to communicate with the Internet. In such an implementation, the web server 710 does not need to be redesigned because all of the synchronization and communication is handled by the synchronization controller 720.

The voice mode system 740 stores VXML pages that are of interest to a user and allows a user to interface with these VXML pages using voice input and output. The VXML pages can be updated or changed as desired and in a variety of ways, such as, for example, by downloading the VXML pages from the WWW during off-peak hours. The voice mode system 740 is a voice gateway, but is referred to as a voice mode system to note that it is a modified voice gateway. The voice mode system 740 performs voice recognition of user voice input and renders output in a simulated voice using the voice interface 275.

Figure 8:
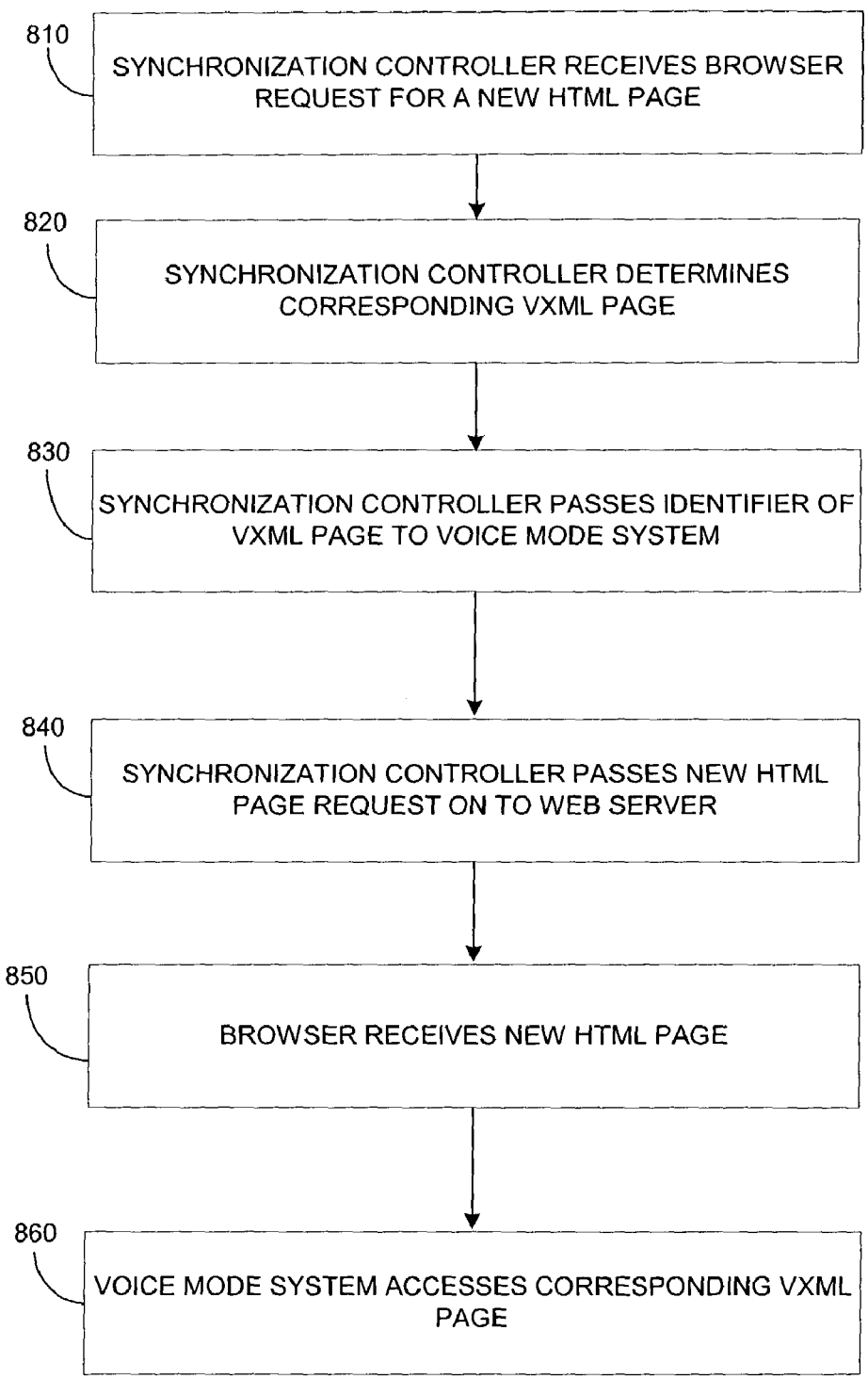
FIG. 8 is an example of a process for synchronizing a browser and a voice mode in the system of FIG. 7 after a browser input.
Figure 9:
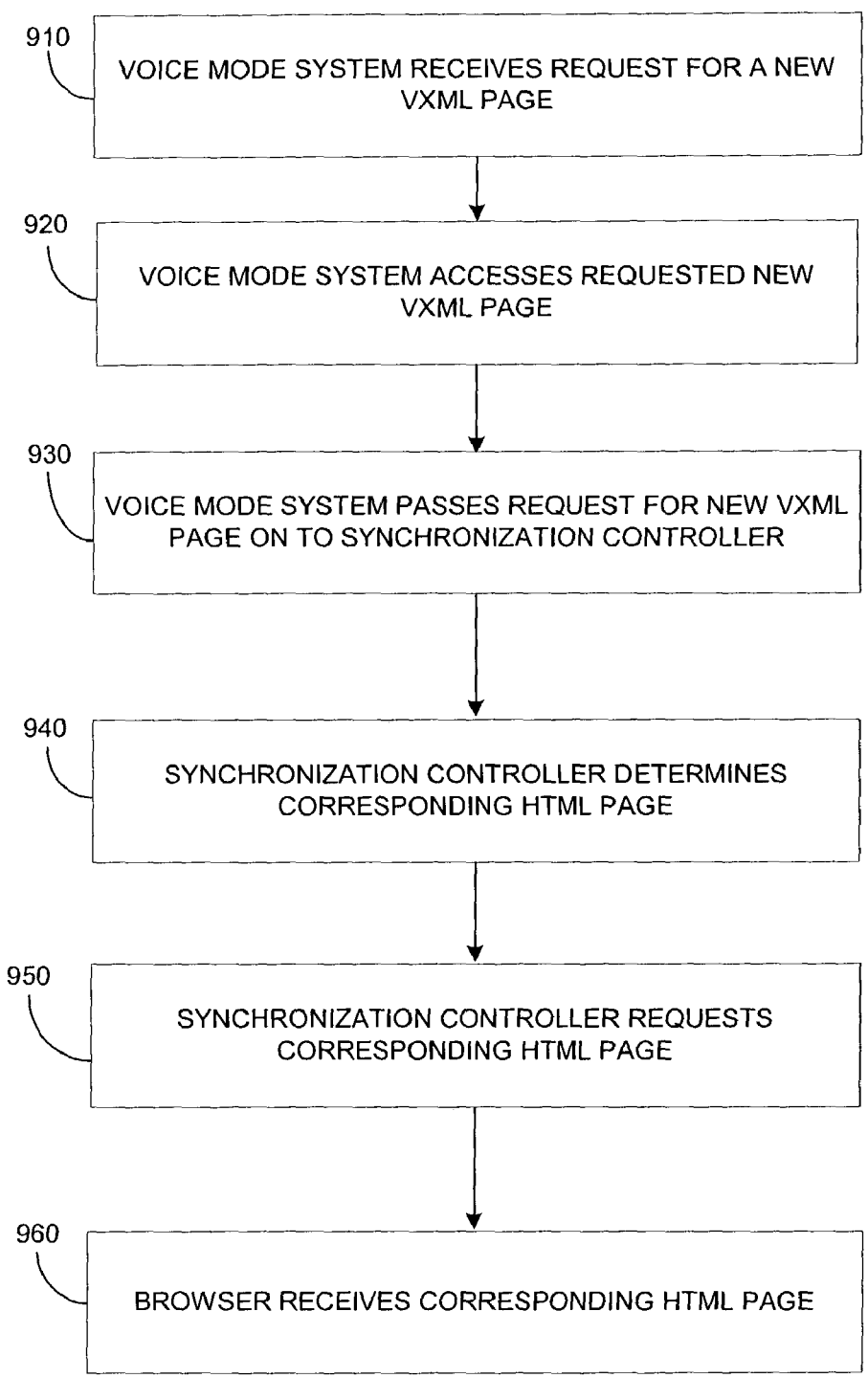
FIG. 9 is an example of a process for synchronizing a browser and a voice mode in the system of FIG. 7 after a voice input.

The synchronization controller 720 also performs synchronization between the browser and voice modes. Referring to FIGS. 8 and 9, two processes are described for synchronizing the browser 735 and the voice mode system 740, or alternatively, the browser interface 270 and the voice interface 275.

Referring to FIG. 8, a process 800 includes having the synchronization controller 720 receive a browser request for a new HTML page (810). The browser 735 may be designed to send requests to the synchronization controller 720, or the browser 735 may send the requests to the web server 710 and the synchronization controller 720 may intercept the browser requests.

The process 800 includes having the synchronization controller 720 determine a VXML page that corresponds to the requested HTML page (820). In particular implementations, when the user requests a new HTML page by clicking on a link with the browser 735, the HTML data also includes the URL for the corresponding VXML page. Further, the browser 735 sends both the URL for the requested HTML page and the URL for the corresponding VXML page to the synchronization controller 720. The synchronization controller 720 determines the corresponding VXML page simply by receiving from the browser 265 the URL for the corresponding VXML page. The synchronization controller 720 may also determine the corresponding page by, for example, performing a table look-up, accessing a database, applying a translation between HTML URLs and VXML URLs, or requesting information from the web server 710.

The process 800 includes having the synchronization controller 720 pass the identifier of the corresponding VXML page to the voice mode system 740 (830). The identifier may be, for example, a URL. In particular implementations, the voice mode system 740 may intercept browser requests for new HTML pages, or the browser 735 may send the requests to the voice mode system 740. In both cases, the voice mode system 740 may determine the corresponding VXML page instead of having the synchronization controller 720 determine the corresponding page (820) and send an identifier (830).

The process 800 includes having the synchronization controller 720 pass the browser's HTML page request on to the server 710 (840). The synchronization controller 720 may, for example, use a HTTP request. In implementations in which the synchronization controller 720 intercepts the browser's request, passing of the request (840) is performed implicitly. The synchronization controller 720 may delay sending the browser request to the server (840) until later in the process 800 in order, for example, to better time the arrival of the requested HTML page at the browser 735 with the access of the corresponding VXML page at the voice mode system 740 (see 860).

The process 800 includes having the browser receive the requested HTML page (850) and having the voice mode system 740 access the corresponding VXML page (860). Once these two pages are loaded and available for facilitating interaction with a user, the two modes will be synchronized.

Referring to FIG. 9, a process 900 includes having the voice mode system 740 receive a user request for a new VXML page (910) and access the requested VXML page (920). The voice mode system 740 accesses the VXML page from, for example, stored VXML pages. Accessing the requested VXML page (920) may be delayed to coincide with the browser's receipt of the corresponding HTML page in operation 960.

The process 900 includes having the voice mode system 740 pass the request for the VXML page on to the synchronization controller 720 (930), and having the synchronization controller 720 determine the corresponding HTML page (940). In particular implementations, the voice mode system 740 may determine the corresponding HTML page, or may pass the request for the VXML page directly to the browser 735 with the browser 735 determining the corresponding HTML page.

The process 900 includes having the synchronization controller 720 request the corresponding HTML page from the web server 710 (950) and having the browser receive the corresponding HTML page (960). The synchronization controller 720 may use, for example, a HTTP get command.

Proxy Implementations

Figure 10:
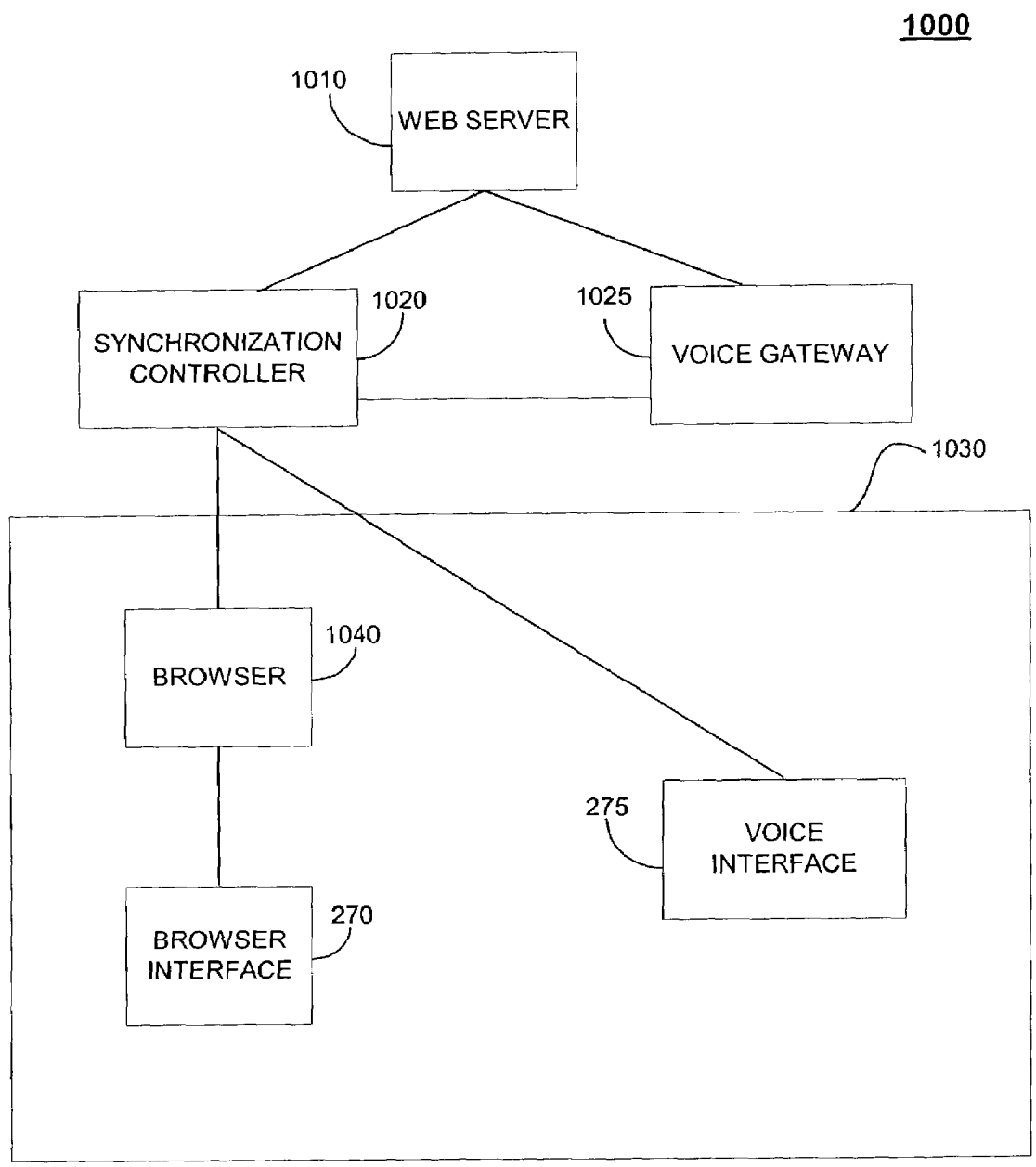
FIG. 10 is an example of a proxy system for synchronizing multiple communication modes.

Referring to FIG. 10, a system 1000 includes having a web server 1010 communicate with both a synchronization controller 1020 and a voice gateway 1025. The synchronization controller 1020 further communicates with both the voice gateway 1025 and several components on a device 1030. The device 1030 includes the browser interface 270, a browser 1040, and the voice interface 275. The browser 1040 communicates with the browser interface 270 and the synchronization controller 1020. The voice interface 275 communicates with the synchronization controller 1020.

The web server 1010 is capable of delivering HTML and VXML pages. The device 1030 may be, for example, a computer or a portable PDA that is equipped for two modes of interfacing to the WWW. The system 1000 allows the two modes to be synchronized, and the system 1000 does not require the web server 1010 to be enhanced or redesigned because the synchronization controller 1020 is independent and separate from the web server 1010.

Figure 11:
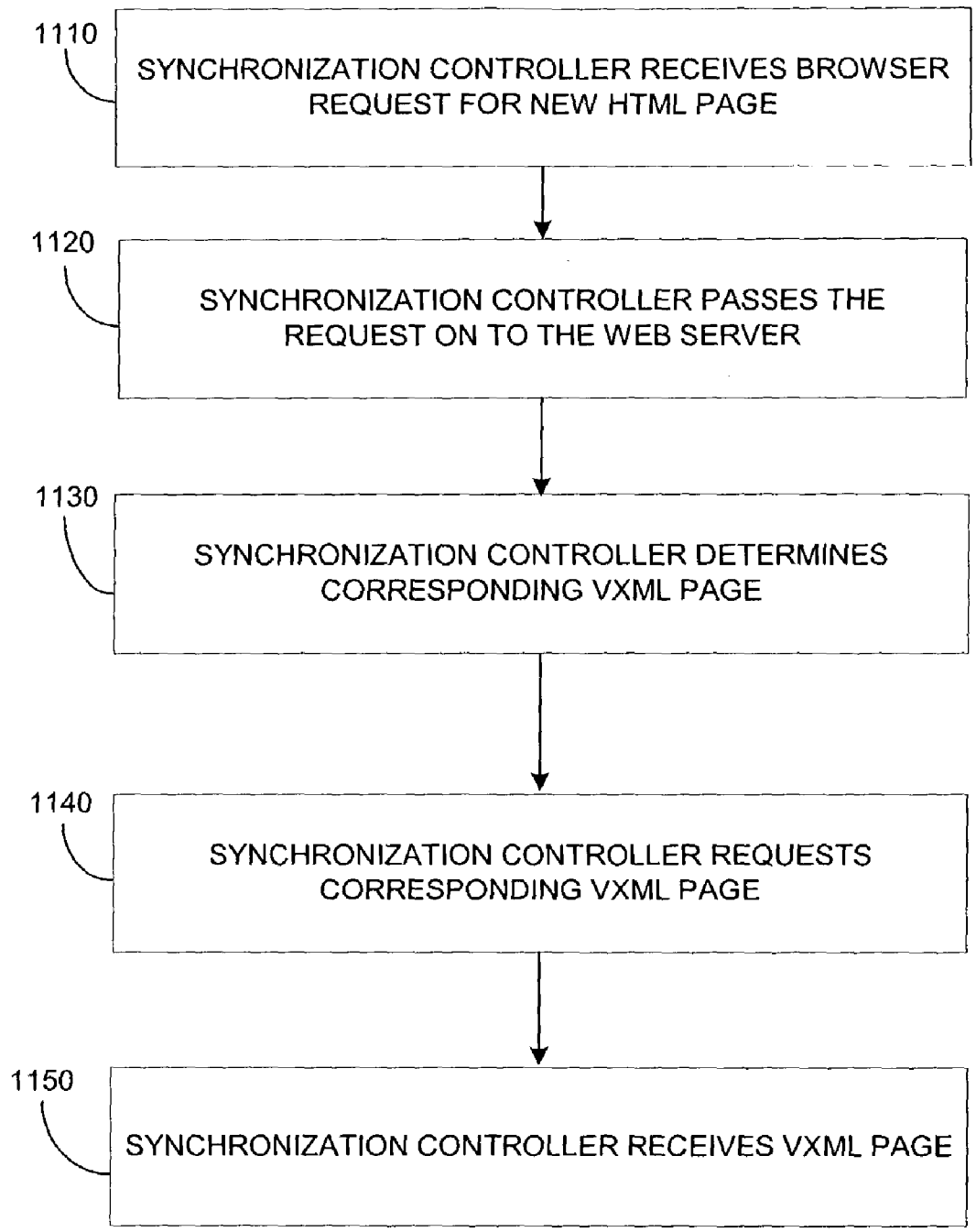
FIG. 11 is an example of a process for synchronizing a browser and a voice mode in the system of FIG. 10 after a browser input.
Figure 12:
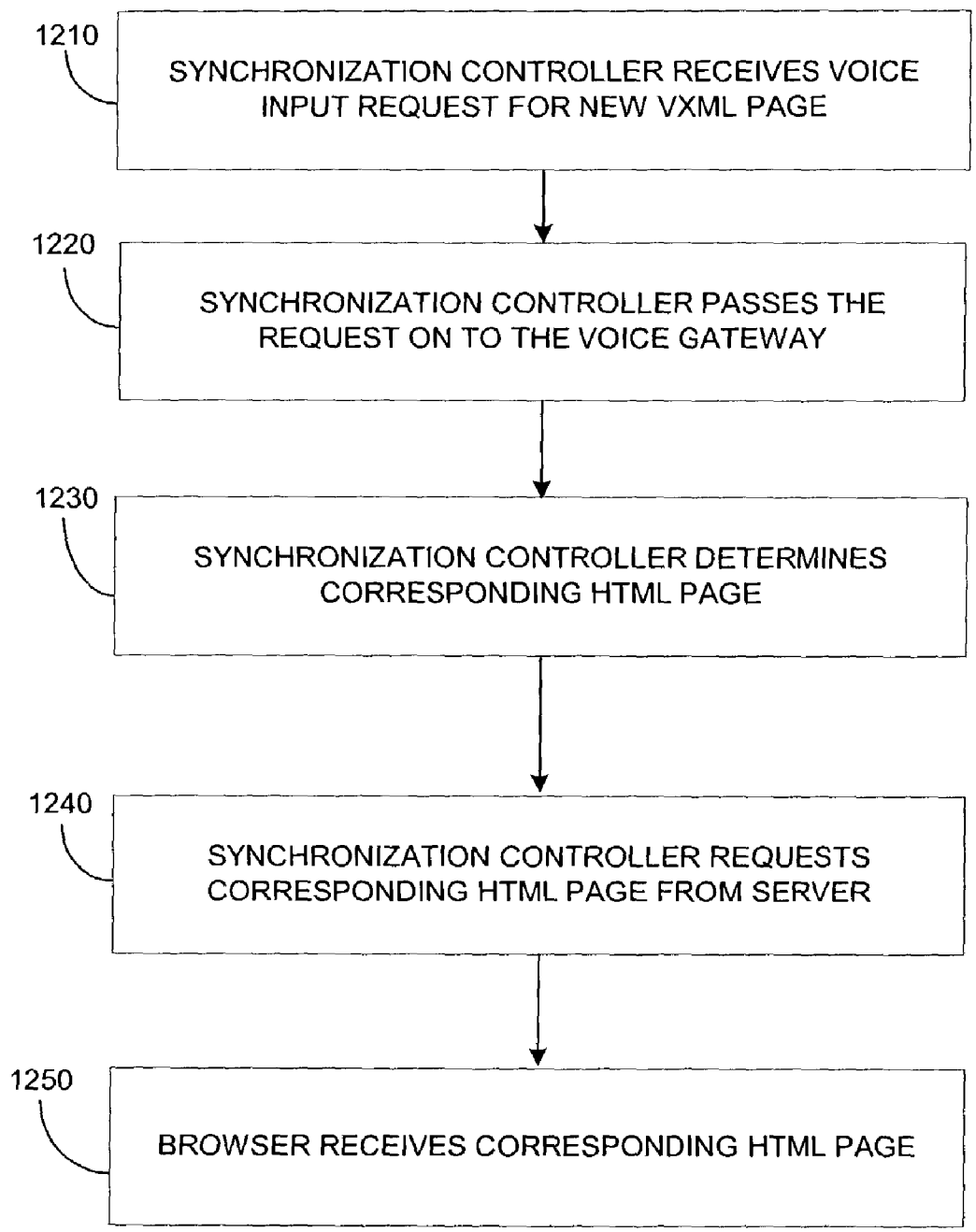
FIG. 12 is an example of a process for synchronizing a browser and a voice mode in the system of FIG. 10 after a voice input.

Referring to FIGS. 11 and 12, two processes are described for synchronizing the browser 1040 and the voice gateway 1025, or alternatively, the browser interface 270 and the voice interface 275. Both processes assume that the user input is a request for a new page, although other inputs may be used.

Referring to FIG. 11, a process 1100 includes having the synchronization controller 1020 receive a browser request for a new HTML page (1110). The process 1100 also includes having the synchronization controller 1020 pass the HTML request on to the web server 1010 (1120) and determine the corresponding VXML page (1130). These three operations 1110-1130 are substantially similar to the operations 810, 840, and 820, respectively, except for the location of the synchronization controller (compare 720 with 1120). The synchronization controller 1020 may delay sending the browser request to the web server 1010 (1120) until later in the process 1100 in order, for example, to better time the arrival of the requested HTML page at the browser 1040 with the arrival of the corresponding VXML page at the synchronization controller 1020 (see 1150).

The process 1100 includes having the synchronization controller 1020 request the corresponding VXML page through the voice gateway 1025 (1140). The synchronization controller 1020 may request the page in various ways. For example, the synchronization controller 1020 may send a simulated voice request to the voice gateway 1025, or may send a command to the voice gateway 1025.

The process 1100 includes having the synchronization controller 1020 receive the corresponding VXML page (1150). The voice gateway 1025 receives the requested VXML page and sends the VXML page to the synchronization controller 1020. In another implementation, the synchronization controller 1020 does not receive the VXML page, and the voice gateway 1025 does the voice recognition and interfacing with the user with the synchronization controller 1020 acting as a conduit.

Referring to FIG. 12, a process 1200 includes having the synchronization controller 1020 receive a voice input from the voice interface 275 requesting a new VXML page (1210). The process 1200 includes having the synchronization controller (i) parse the voice input and pass the request for a new VXML page along to the voice gateway 1025 (1220), and (ii) determine the corresponding HTML page (1230). In this implementation, the synchronization controller 1020 has access to and stores the current VXML page, which allows the synchronization controller 1020 to parse the voice input. As explained above, having the current VXML page may also allow the synchronization controller 1020 to determine the corresponding HTML page for "voice click" events. If the user's input is not the voice equivalent of clicking on a link, but is, for example, a spoken URL, then by having the capability to do the voice recognition, the synchronization controller may be able to parse the URL and request that the server provide the URL for the corresponding HTML page.

The process 1200 includes having the synchronization controller 1020 request the corresponding HTML page from the server (1240), and having the browser receive the requested HTML page (1250). In another implementation, the synchronization controller 1020 does not determine the corresponding page, but requests that the web server 1010 determine the corresponding page and send the corresponding page.

In yet another implementation, the synchronization controller 1020 does not parse the voice input, but merely passes the VoIP request along to the voice gateway 1025. If the voice input is a request for a VXML page, the voice gateway 1025 determines the corresponding HTML page and provides the synchronization controller 1020 with a URL for the HTML page.

Figure 13:
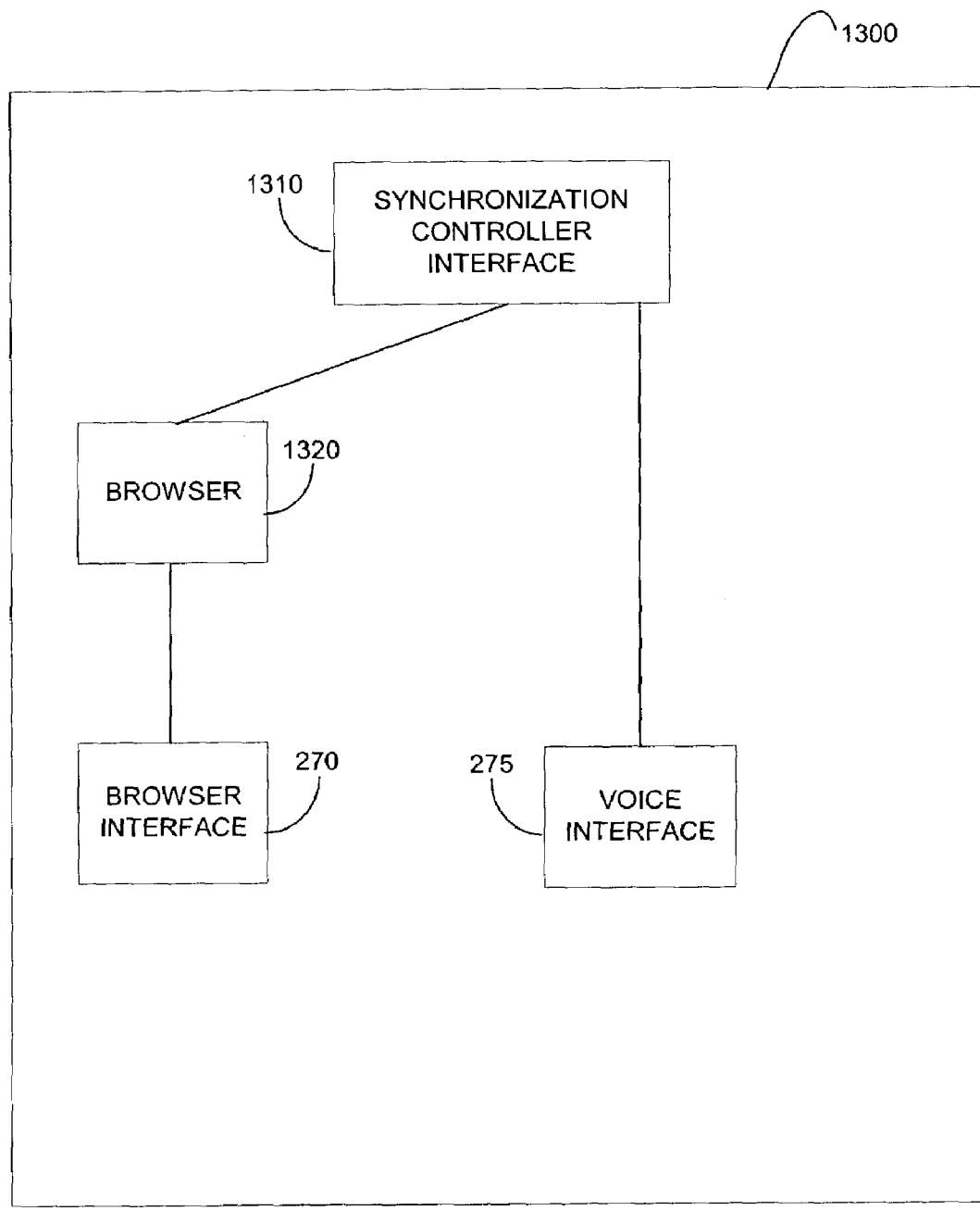
FIG. 13 is an example of a device for communicating with a synchronization controller in a proxy system for synchronizing multiple communication modes.

Referring to FIG. 13, a device 1300 includes a synchronization controller interface 1310, a browser 1320, the browser interface 270, and the voice interface 275. The browser 1320 communicates with the browser interface 270 and the synchronization controller interface 1310. The synchronization controller interface 1310 further communicates with the voice interface 275. The device 1300 is similar to the device 1030 except that the functionality allowing the browser 1040 and the voice interface 275 to communicate with the synchronization controller 1020 is separated as the synchronization controller interface 1310. In one implementation, the device 1300 is a mobile device. Such a mobile device is smaller and lighter than if a synchronization controller was also implemented on the mobile device. Further, because such a mobile device does not contain the functionality of a synchronization controller, but only includes an interface, the mobile device may be able to take advantage of improvements in a synchronization controller without having to be redesigned.

Additional Variations

Each of the above implementations may be used with more than two different modes. For example, inventory, shipping, or other data may be accessed in a warehouse using three different modes, and one or more machines accessing the warehouse data may need to be synchronized. The first mode may include keyboard input; the second mode may include voice input; and the third mode may include input from scanning a bar code on a pallet, for example, to request a particular record. Output for any of the modes may include, for example, display output, voice output, or printer output.

The processes described have been principally explained in terms of a particular system. However, each of the processes may be used with a variety of other implementations of a centralized, fused, proxy, or other type of system.

Referring again to FIG. 1, the server system 110 includes one or more devices for storing, at least temporarily, information that can be accessed by one or more gateways. For example, a web server has a storage device for storing web pages. The server system 110 may include multiple storage devices that are located locally or remotely with respect to each other. The server system 110 may include one or more storage devices that are located locally to another component, such as, for example, the device 160 or the second gateway 185. In various implementations, the server system 110 or the synchronization controller 120 are not contained in the unit 140.

The synchronization controller 120 maintains or establishes synchronization between two or more devices, such as, for example, gateways and/or interfaces. The components of the synchronization controller 120 may be remote or local with respect to each other and may be local to one or more of the other components in the system 100 such as, for example, the device 160, the second gateway 185, or the publish/subscribe system 150.

The publish/subscribe system 150 refers to a system that receives and sends messages. In particular implementations, the publish/subscribe system 150 can only receive messages from, or send messages to, subscribed entities—with the exception of receiving a subscribe request.

The device 160 may be an electronic device, an optical device, a magnetic device, or some other type of device capable of communicating with a user and with other systems. Examples include a computer, a PDA, a server, or a set-top box.

The connections 130, 180, 190, 194, and 196, and other connections throughout the disclosure, may be direct or indirect connections, possibly with one or more intervening devices. A connection may use one or more media such as, for example, a wired, a wireless, a cable, or a satellite connection. A connection may use a variety of technologies or standards such as, for example, analog or digital technologies, packet switching, code division multiple access ("CDMA"), time division multiple access ("TDMA"), and global system for mobiles ("GSM") with general packet radio service ("GPRS"). A connection may use a variety of established networks such as, for example, the Internet, the WWW, a wide-area network ("WAN"), a local-area network ("LAN"), a telephone network, a radio network, a television network, a cable network, and a satellite network.

The processes 300-600 are amenable to numerous variations, several examples of which follow, and may be applied to architectures different than that of the system 200. Separate devices, each including one gateway, can be synchronized by keeping track of the IP addresses and port numbers of the separate devices, or by having the devices subscribe to the same topic at a publish/subscribe system. For example, a user may be operating a first-modality interface on a first machine, and operating a second-modality interface on a second machine. As another example, two or more users may be remotely located and may want to be synchronized. The remotely located users may be operating the same modality interface, or different modality interfaces.

The voice commands discussed as initiating operation 320 or 410, and the browser commands discussed as initiating operation 520 or 620, may be navigation commands or non-navigation commands. Navigation commands include, for example, specifying a URL, and entering a home, back, or forward command. Non-navigation commands include, for example, a text entry, a preference change, or a focus command.

Any input received by a gateway, including command and data, may be provided to the server by the voice gateway or the browser. For example, the voice gateway may provide the server with text entries and other inputs, even when the voice gateway does not need a VXML page, so that the server can supply the input to the browser to keep the browser synchronized with respect to text entries, and not just with respect to new pages.

In various implementations, the server's message to a gateway in operation 360, 460, or 560 may include, for example, (i) the actual corresponding HTML/VXML page, (ii) the URL of the corresponding page with a command to retrieve the corresponding page, (iii) the URL of a JSP that identifies the corresponding page, (iv) a command relating to the corresponding page or to a JSP that identifies the corresponding page, and (v) an indication to reload the current page (into which the server has embedded a command that will retrieve the corresponding page).

A first item is said to relate to first data when the first item includes information relating to the first data. Such information may include, for example, the first data itself, an address of the first data or some other pointer to the first data, an encoding of the first data, and parameters identifying particular information from the first data. The first data may include any of the many examples described in this disclosure as well as, for example, an address of some other data, data entered by a user, and a command entered by a user.

In sending the corresponding input, or an indication of the corresponding input, to a gateway (340-50, 450, 540-550, or 660), a server may send, for example, a command or parameters. A command may include, for example, a JavaScript command that requests the corresponding page. Parameters may include, for example, a URL of the corresponding page. The parameters are parsed, a command is determined, and the command is executed. For example, in operation 660, instead of sending the corresponding VXML page, the server may send a message with parameters including a URL (for the corresponding VXML page) and an indication that the voice gateway should request the page identified by the URL.

In the processes 300-600, the web server 240 is described as performing a variety of actions. As described earlier, the web server 240 includes a synchronization controller and many of the actions performed by the web server 240 can be characterized as being performed by the synchronization controller.

Referring to FIGS. 8 and 9, operations 810 and 910 may be generalized to allow the synchronization controller 720 to receive other browser inputs, and the voice mode system 740 to receive other voice inputs. The inputs may include, for example, a command, a request for a new page, a data input, and a focus request. In one implementation of operation 910, the voice mode system 740 receives a user's city selection for a field in a VXML page that solicits the user's address. Receipt of the city selection causes the VXML to move to the dialogue entry for selecting a state. The voice mode system 740 may pass this selection to the browser 735 so that the user's screen display can be updated.

Further, the voice mode system 740 may be a voice gateway. In such an implementation, the voice gateway would not have any VXML pages stored locally and would request them from the web server 710. The synchronization controller 720 may intercept or control the voice gateway requests in a manner analogous to the manner in which the synchronization controller 720 may intercept or control the browser requests.

One or more of the functions of the synchronization controller 720 may be performed by either the browser 735 or the voice mode system 740. For example, the browser 735 may send HTML page requests to the voice mode system 740, and the voice mode system 740 may determine the corresponding VXML page.

As indicated by the breadth of implementations disclosed, the synchronization controller can be placed at various locations within a system. Further, the component functions of a synchronization controller can be separated and placed at different locations within a system. This flexibility allows the complexity of a system to be targeted to one or more particular devices. By keeping the synchronization controller functions off of a mobile device, for example, mobile devices may be more lightweight, less expensive, and more robust to technology enhancements in the synchronization controller. By using a proxy model, a mobile device is still free of the synchronization controller and enjoys the noted benefits. Further, by using a proxy model, the multitude of existing web servers may not need to be redesigned, and the synchronization controller may allow multiple types of mobile devices to communicate with the same server infrastructure. Using a publish/subscribe system, operating as in the implementations described or according to other principles, may also facilitate an architecture with minimal install time for client devices, such that client devices are changed only minimally.

A synchronization controller may consist of one or more components adapted to perform, for example, the functions described for a synchronization controller in one or more of the implementations in this disclosure. The components may be, for example, hardware, software, firmware, or some combination of these. Hardware components include, for example, controller chips and chip sets, communications chips, digital logic, and other digital or analog circuitry.

The implementations disclosed can be characterized as providing synchronizing mechanisms. Such synchronizing mechanisms may include, for example, (i) sending a message to a publish/subscribe system, (ii) sending a message to a browser, possibly with a URL for a new page or a JSP, (iii) updating state information by, for example, updating a JSP, (iv) sending a corresponding page directly to a gateway, (v) requesting a corresponding page from an intermediary or from a storage location having the page, (vi) determining a corresponding page, and (vii) requesting a determination of a corresponding page and, possibly, requesting receipt of that determination. Various of the listed mechanisms may be performed by a synchronization controller, a web server, a gateway, or another component adapted to provide such functionality.

Many of the disclosed implementations have focused on WWW and Internet applications. However, the features described can be applied to a variety of communication environments, networks, and systems. The use of the term "page" is not meant to be restrictive and refers to data in a form usable by a particular gateway, interface, or other component.

Throughout this disclosure various actions are described. These terms, which include, for example, receiving, accessing, providing, sending, requesting, determining, passing, and routing, and others like them, are intended to be broadly construed. Accordingly, such terms are not restricted to acting directly but may act through one or more intermediaries. For example, a page may be sent to a gateway, provided to a gateway, or received from a gateway, even though the page may first go through a controller or a publish/subscribe system. As another example, a corresponding page may be determined by requesting another component to provide the corresponding URL.

Additional details about particular implementations, focusing largely on various mechanisms for associating two or more modalities with each other, will now be provided. The implementations described above may use a variety of mechanisms to associate modalities, many of which are within the skill of one of ordinary skill without requiring undue experimentation. Such mechanisms may include various tabular approaches and naming conventions to associate modalities and/or devices. Further, for fused implementations as described above, a device may be programmed to associate the multiple modes supported on the device. Implementations described above may also query a user for information that identifies the modes and/or devices that the user desires to have associated.

Accordingly, the implementations described above have sufficient detail to allow one of ordinary skill to make and use the implementations without undue experimentation, and the disclosure of the mechanisms below is not necessary to enable or describe the implementations discussed above. However, the following discussion does provide additional disclosure supporting, for example, specific dependent claims to the disclosed mechanisms and implementations.

Synchronizing Using IP Addresses

Figure 14:
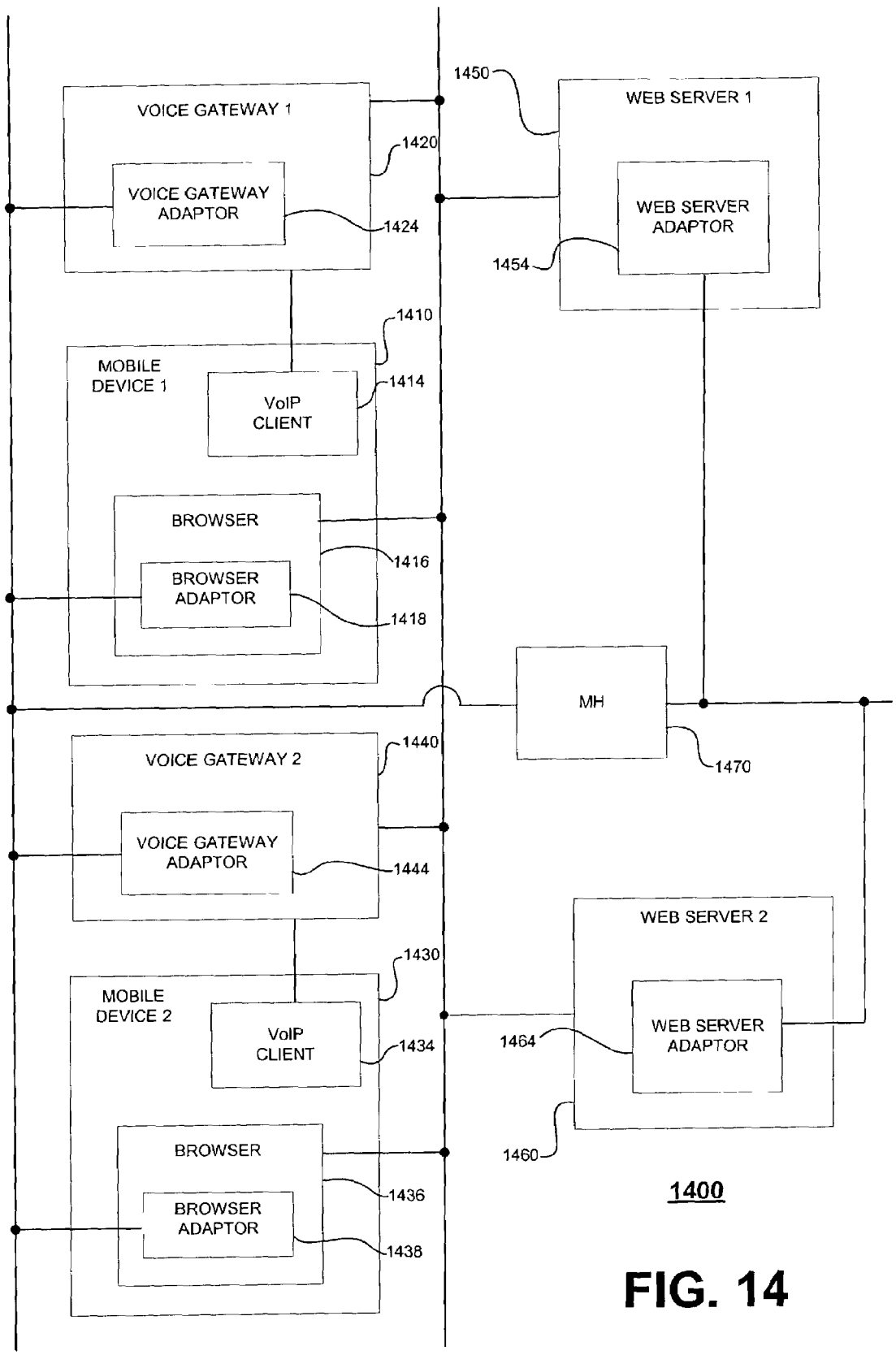
FIG. 14 is an example of a system with multiple mobile devices, voice gateways, and servers, with various components shown to include adaptors.

Referring to FIG. 14, a system 1400 includes a first mobile device 1410 including a first "voice over Internet Protocol" ("VoIP") client 1414 and a first browser 1416, with the first browser 1416 including a first browser adaptor 1418. First VoIP client 1414 is coupled to a first voice gateway 1420 that includes a voice gateway adaptor 1424.

System 1400 includes a second mobile device 1430 including a second VoIP client 1434 and a second browser 1436, with the second browser 1436 including a second browser adaptor 1438. Second VoIP client 1434 is coupled to a second voice gateway 1440 that includes a second voice gateway adaptor 1444.

System 1400 includes a first web server 1450 including a first web server adaptor 1454. System 1400 includes a second web server 1460 including a second web server adaptor 1464. First web server 1450 and second web server 1460 are each coupled to the first browser 1416, the first voice gateway 1420, the second browser 1436, and the second voice gateway 1440. System 1400 further includes a messaging handler 1470 coupled to the first web server adaptor 1454, the second web server adaptor 1464, the first browser adaptor 1418, the first voice gateway adaptor 1424, the second browser adaptor 1438, and the second voice gateway adaptor 1444. Web server adaptors 1454 and 1464 each can be implemented as part of a multi-modal application running on web server 1450 or 1460, respectively.

Figure 15:
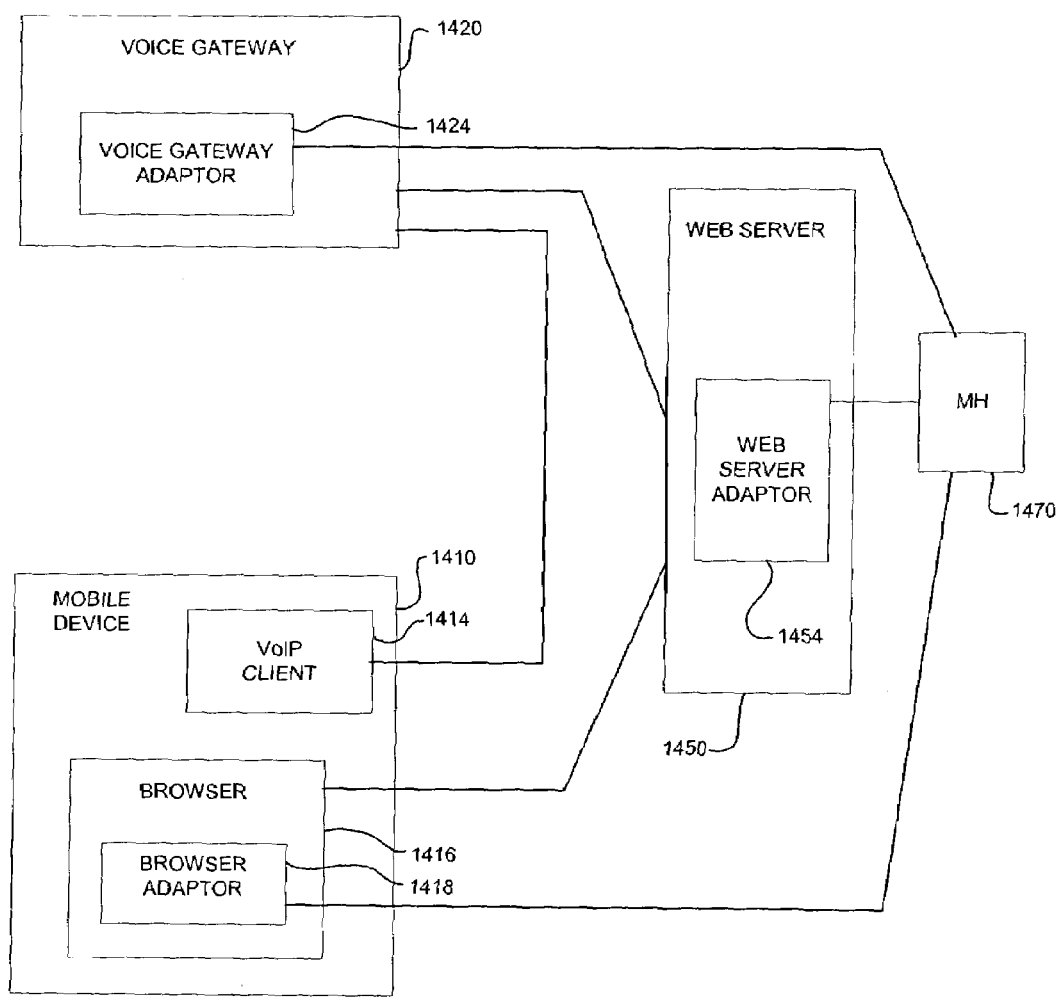
FIG. 15 is an example of a limited implementation of the system of FIG. 14.

Referring to FIG. 15, a system 1500 is a smaller implementation of the general system of FIG. 14. System 1500 includes first mobile device 1410 (referred to as mobile device 1410), first voice gateway 1420 (referred to as voice gateway 1420), first web server 1450 (referred to as web server 1450), and messaging handler 1470, as well as their constituent components described above in the description of FIG. 14.

Figure 16:
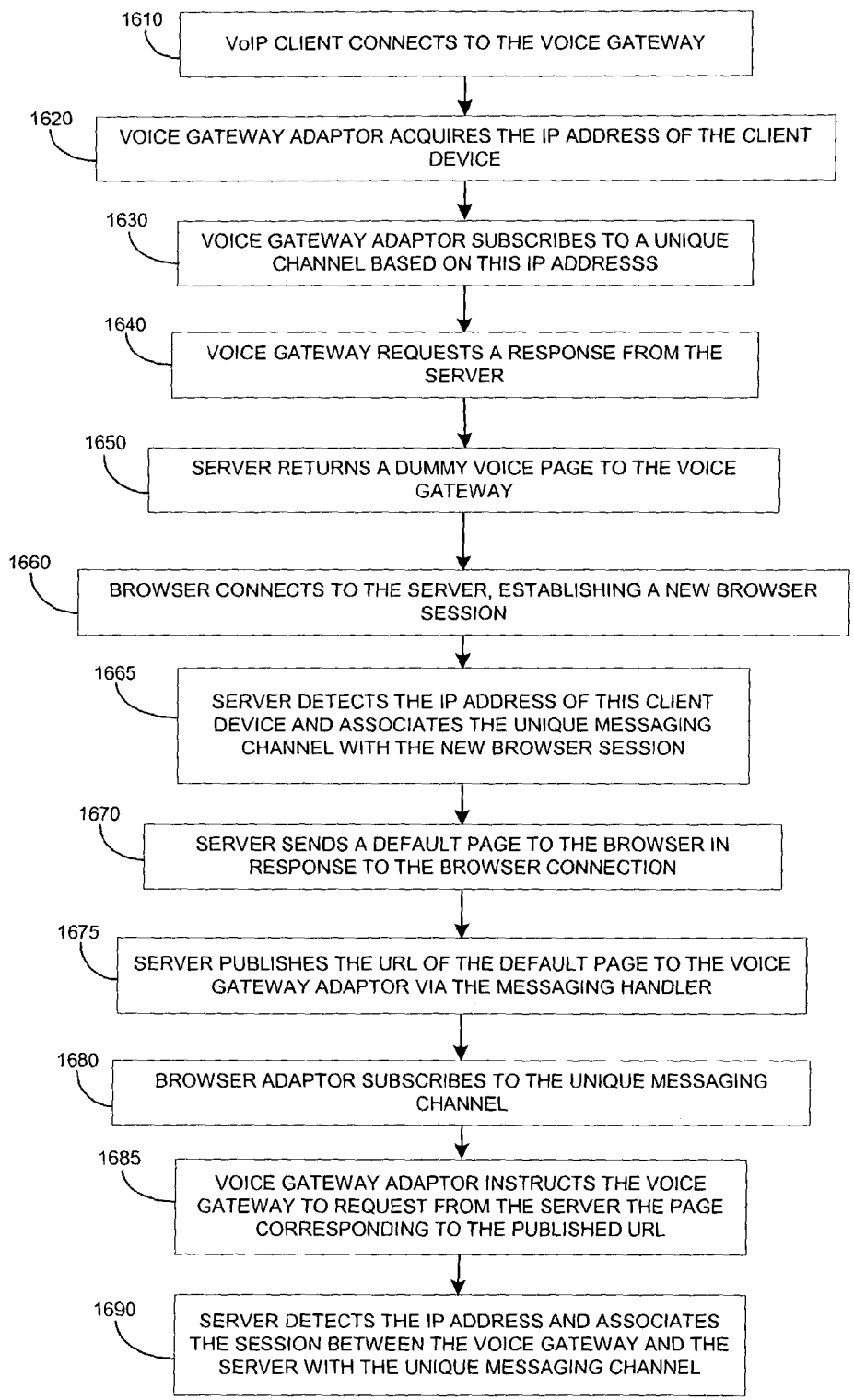
FIG. 16 is an example of a process for using the system of FIG. 15.

Referring to FIG. 16, a process 1600 can be used with system 1500 and generally describes one implementation for establishing communication between various components and associating two modalities. The association described in process 1600 may be used by, for example, one or more of the various synchronization processes described above.

Process 1600 includes having VoIP client 1414 connect to voice gateway 1420 (1610). This connection (1610) may be established in response to a user requesting a voice connection at mobile device 1410 by, for example, using a stylus to select a "connect" icon. A standard protocol, such as, for example, International Telecommunications Union—T Recommendation H.323 ("H.323") or Session Initiation Protocol ("SIP"), may be used between VoIP client 1414 and voice gateway 1420 in specific implementations.

Process 1600 also includes having voice gateway adaptor 1424 acquire the Internet Protocol ("IP") address of mobile device 1410 (1620). The IP address may be part of the VoIP protocol being used, in which case the voice gateway adaptor 1424 may acquire the IP address by, for example, pulling the IP address out of the connection header. The IP address may also be acquired, for example, by querying the user or mobile device 1410.

The various adaptors in system 1500 generally handle the messaging interface for the gateway/server and may be implemented, for example, as a software plug-in. In various implementations, adaptors function as listener processes and browser adaptors comprise software embedded in each HTML page, with the software calling routines stored on the browser machine. As each HTML page is received, and the embedded software is executed, the execution of the software may give rise to an adaptor for that HTML page being instantiated on the browser machine. These implementations may also embed similar calls in VXML pages in implementations that support such calls at a voice gateway. For systems having voice gateways that do not support such calls, the voice gateway may include a single listener process (adaptor) that interfaces with the messaging handler. Analogously, one browser adaptor may support multiple HTML pages in implementations that support such calls at the display browser.

Process 1600 includes having voice gateway adaptor 1424 subscribe to a unique channel based on the IP address of the mobile device 1410 (1630). Voice gateway adaptor 1424 may use, for example, HTTP to communicate with messaging handler 1470. Messaging handler 1470 creates the channel and uses the IP address as a name or other reference for the channel, and voice gateway adaptor 1424 subscribes to the unique channel. The channel is unique because it is described by the unique IP address of mobile device 1410.

Process 1600 includes having voice gateway 1420 request a response from web server 1450 (1640). Voice gateway 1420 may send a HTTP request to web server 1450 to request a response. Because no specific web page has been requested at this point by VoIP client 1414, the request may be for a default page that need not contain any content (that is, a dummy page). Specific implementations may perform this operation as part of a start-up procedure that allows time for browser 1416 to connect to web server 1450 before requesting or sending web pages with content. Web server 1450 may perform this functionality using a standard web server application that is enhanced to support synchronizing multiple modalities.

Process 1600 includes having web server 1450 return a dummy voice page to voice gateway 1420 (1650). Process 1600 also includes having browser 1416 connect to web server 1450 and establish a new browser session (1660). Browser 1416 may connect in response, for example, to a user entering the URL of a desired web page, or in response to a connect command.

Process 1600 includes having web server 1450 detect the IP address of mobile device 1410 and associate the unique messaging channel with the new session that was established between browser 1416 and web server 1450 (1665). In particular implementations, the IP address is embedded in the HTTP communication between browser 1416 and web server 1450, and web server 1450 detects the IP address by extracting the IP address from the communication. In one implementation, web server 1450 assumes that a unique messaging channel referenced by the IP address exists and associates the session with the unique messaging channel using a table or data structure.

Process 1600 includes having web server 1450 send a web page to browser 1416 in response to first web browser 1416 connecting to web server 1450 (1670). The web page sent to a browser is typically a HTML page. If the browser-server connection was established (1660) in response to a user entering the URL of a desired web page, then web server 1450 may send the requested web page.

Process 1600 includes having web server 1450 publish the URL of the web page sent to browser 1416 to voice gateway adaptor 1424 through messaging handler 1470 (1675). Web server 1450 publishes the URL to the unique messaging channel identified or referenced by the IP address of mobile device 1410. First web server adaptor 1454 (referred to as web server adaptor 1454) is used to publish to messaging handler 1470. Initially, only voice gateway adaptor 1424 is subscribed to the unique messaging channel, so there is no ambiguity as to what entity is the intended recipient of the message.

In typical implementations, the URLs of corresponding VXML and HTML web pages are the same. Thus, in the typical implementations, a server need only publish the URL to allow the other modality to identify a corresponding web page. In implementations in which corresponding pages (or other data) do not have the same URL or other identifier, a server (or other component) may determine the identifier for the corresponding page.

Process 1600 includes having browser adaptor 1418 subscribe to the unique messaging channel (1680). Both voice gateway adaptor 1424 and browser adaptor 1418 are now subscribed to the unique messaging channel and can receive messages published to that channel.

Operation 1680 is performed earlier in certain implementations. In an implementation in which browser adaptor 1418 subscribes in operation 1660, because both voice gateway adaptor 1424 and browser adaptor 1418 are subscribed to the unique messaging channel, each will receive the URL published in operation 1670, as well as subsequently published URLs. In operation 1670, voice gateway adaptor 1424 may then recognize itself as the intended recipient of the message by, for example, (i) having web server 1450 embed information in the message indicating which one or more adaptors are to act on the message, or (ii)

having web server 1450 use a sub-channel of the unique messaging channel. Alternatively, both adaptors 1424 and 1418 may act on the message, as explained below, and the respective gateway 1420 and 1416 may determine whether a page needs to be requested.

Process 1600 includes having voice gateway adaptor 1424 instruct voice gateway 1420 to request the web page corresponding to the published URL (1685). After recognizing itself as an intended recipient of the published message, voice gateway adaptor 1424 instructs voice gateway 1420 to request the web page corresponding to the URL embedded in the message. In response, voice gateway 1420 requests the web page from web server 1450. The requested page corresponds to a VXML version of the HTML page that was sent to browser 1416. In implementations in which browser adaptor 1418 also acts on the published message, browser 1416 may determine that the web page to be requested has already been received by browser 1416 and that the message is intended only for voice gateway adaptor 1424.

Process 1600 includes having web server 1450 detect the IP address of mobile device 1410 and associate the session between voice gateway 1420 and web server 1450 with the unique messaging channel (1690). The IP address may be detected as in operation 1665 for browser 1416. Implementations may detect another parameter indicative of the IP address in lieu of the IP address itself. This operation may be performed earlier in process 1600, such as, for example, in operation 1640.

After process 1600 is complete, both adaptors 1424 and 1418 are subscribed to the unique messaging channel at message handler 1470 (1630, 1680), with the channel being described or referenced by the IP address of mobile device 1410. Further, both sessions are associated at web server 1450 with the unique messaging channel (1665, 1690). Accordingly, when a user requests a web page using either modality, the requesting session is already associated with the messaging channel (for example, 1665) and a message can be sent (for example, 1675) that allows a synchronizing web page to be requested (for example, 1685) and delivered.

In other implementations, browser 1416 may connect to web server 1450 before voice gateway 1420 connects to web server 1450. In such implementations, the roles of the two gateways 1416 and 1420 are generally reversed from that described in process 1600.

Synchronizing Using User/Device IDs

Figure 17:
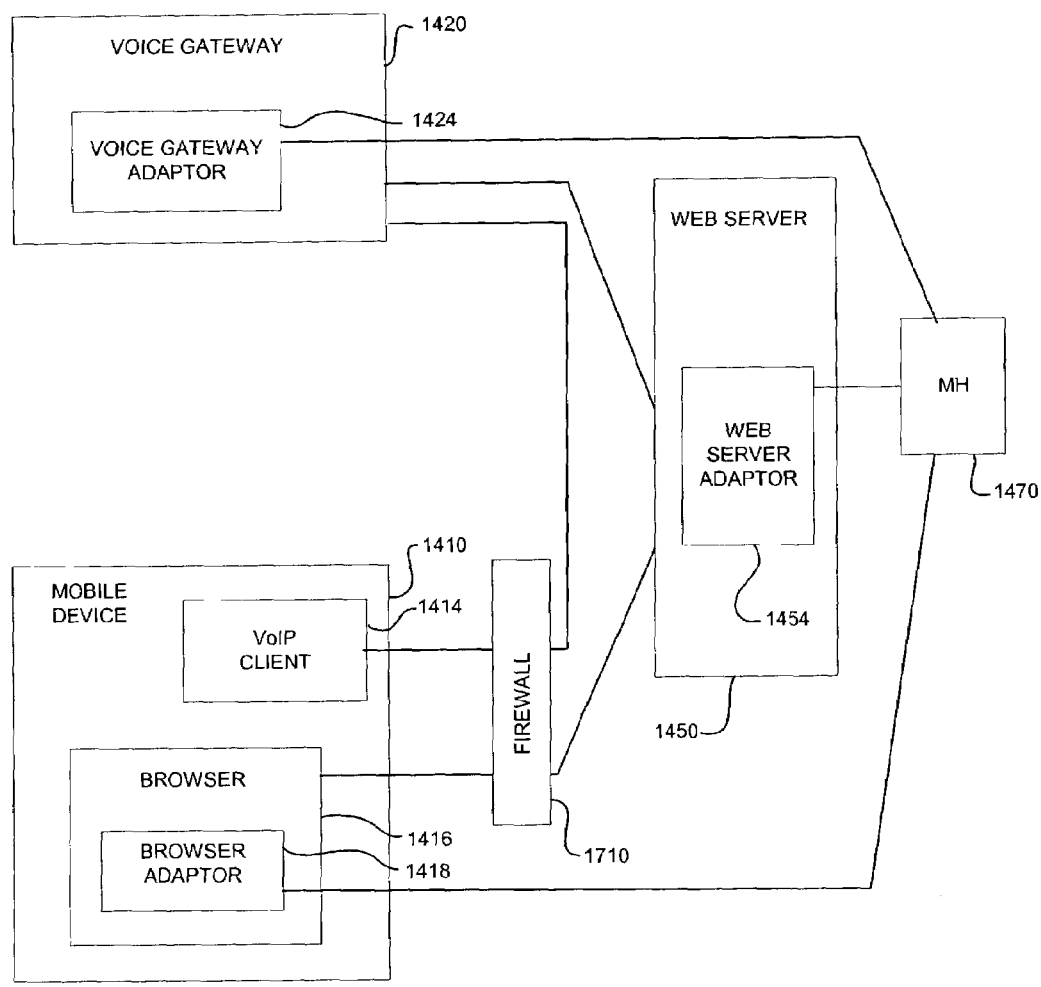
FIG. 17 is an example of the system of FIG. 15 with a firewall.

Referring to FIG. 17, a system 1700 includes the same components as system 1500 and also includes a firewall 1710 that interfaces between mobile device 1410 and both voice gateway 1420 and web server 1450. More specifically, firewall 1710 is disposed between VoIP client 1414 and voice gateway 1420, and between browser 1416 and web server 1450. Thus, firewall 1710 is shown in system 1700 as having four connections.

In typical implementations, firewall 1710 embeds the IP address of firewall 1710 into communications transmitted through firewall 1710 from mobile device 1410. Firewall 1710 thus shields the IP address of mobile device 1410 from transmissions to voice gateway 1420 and web server 1450. Accordingly, if process 1600 is used with system 1700, then the IP address of firewall 1710 will be detected by voice gateway adaptor 1424 in operation 1620 and by web server 1450 in operation 1665. This would cause voice gateway adaptor 1424 to subscribe to a messaging channel identified by the IP address of firewall 1710. Continuing with this example, in operation 1680 browser adaptor 1418 would not be able to subscribe to the same messaging channel unless browser adaptor 1418 knew the IP address of firewall 1710. A more general problem exists, however, for many implementations.

Typical implementations will have multiple mobile devices coupled to firewall 1710. In those implementations, the IP address of firewall 1710 does not provide a unique messaging channel. Consequently, messages published for modalities on a single device will be received by other devices as well.

In one solution, (i) VoIP client 1414 provides a unique identifier to voice gateway 1420 in operation 1610, and (ii) browser 1416 provides the unique identifier to web server 1450 in operation 1660. In that way, (i) voice gateway adaptor 1424 can be configured to detect the unique identifier in operation 1620, and (ii) web server 1450 can be configured to detect the unique identifier in operation 1665. Further, browser adaptor 1418 can be configured to subscribe to the messaging channel identified by the unique identifier and created in operation 1630.

A unique identifier may be, for example, a user ID, a device ID, the combination of an IP address for a device and an IP address of an associated firewall, or a unique hardware identifier. The unique identifier may be provided, for example, by embedding the unique identifier within the communication format in such a way that firewall 1710 does not remove the unique identifier.

Figure 18:
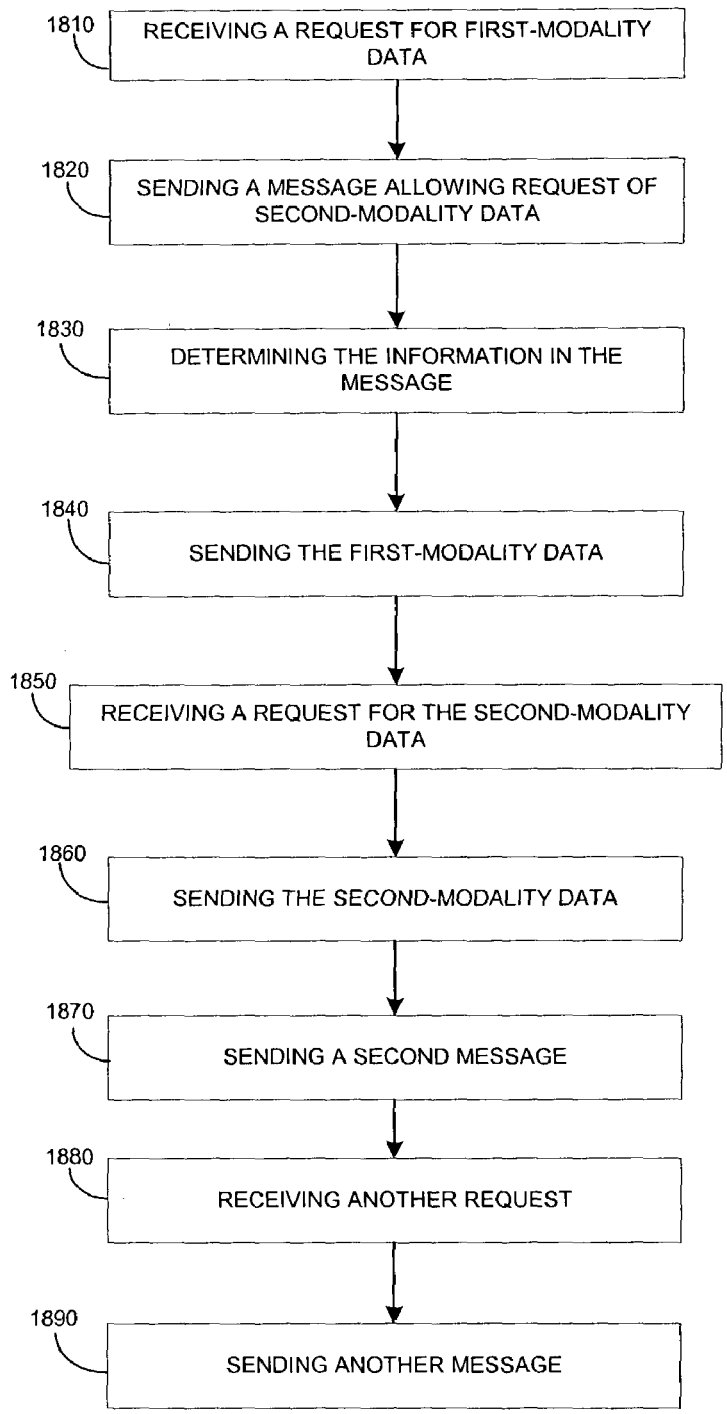
FIG. 18 is an example of a process for sending a synchronization message.

Referring to FIG. 18, a process 1800 may be used to send a synchronization message. Process 1800 may be used by various implementations including, for example, the implementations associated with system 1500 and system 1700.

Process 1800 includes receiving a request for first-modality data (1810). The first modality data includes first content, with the first-modality data being configured to be presented using a first modality, and the request coming from a requestor and being received at a first device. First-modality data includes data that may be presented to a user using a first modality, or that may be responded to by the user using the first modality. Other modality data, such as second-modality data and third-modality data, may be defined similarly.

First-modality data may include, for example, a web page or other data structure, and such a data structure typically includes content. Content generally refers to information that is presented to a user or that a user may be seeking. A data structure may also include, for example, a header having header information, and other formatting information. As an example, a web page may include content that is displayed to a display device by a browser application, and the HTML of the web page may include header and formatting information that control aspects of the display and routing of the web page.

Process 1800 includes sending a message allowing request of second modality data (1820). The message is sent from the first device for receipt by a second device, with the message being sent in response to receiving the request and including information that allows the second device to request second-modality data that includes second content that overlaps the first content, with the second-modality data being configured to be presented using a second modality. The content of the second-modality data may overlap the content of the first-modality data by having common content. For example, a HTML page (first-modality data) and a corresponding VXML page (second-modality data) have common content.

The information allowing a request of the second-modality data may be of various types. For example, the information may include (i) a pointer to the second-modality data (for example, a URL), (ii) a point to a pointer to the second-modality data (for example, a URL of a JSP, with the JSP including the URL of the second-modality data), or (iii) data allowing the address of the second-modality data to be determined (for example, the URL of a HTML page may be provided, from which the URL of the corresponding VXML page can be determined).

Further, the first-modality data and the corresponding second-modality data may be synchronized by presenting the first-modality data and the corresponding second-modality data to a user in such a manner that the user may respond to the overlapping content using either the first modality or the second modality.

Process 1800 includes determining the information that is included in the sent message (1830). For example, if the URL of the first-modality data and the corresponding second-modality data are different, and the information includes the URL of the first-modality data, then the URL of the corresponding second-modality data may be determined by, for example, using a table look-up or an algorithm, or requesting the information from another component or a user.

Process 1800 includes sending the first-modality data to the requester (1840). One or more additional components may be involved in sending the first-modality data to the requester, either upstream or downstream.

Process 1800 includes receiving a request for the second-modality data from the second device (1850). The request may be, for example, (i) a request for second-modality data at a URL identified by the information included in the sent message, (ii) a request for second-modality data at a URL determined from the information included in the sent message, or (iii) a request for second-modality data at an address pointed to by a web page at a URL identified by or determined from the information included in the sent message.

Process 1800 includes sending the second-modality data to the second device (1860). One or more additional components may be involved in sending the second-modality data to the second device, and may be involved either upstream or downstream of the sending. For example, a server may send data through a firewall to a gateway.

Process 1800 includes sending a second message (1870). The second message is sent from the first device in response to receiving the request and for receipt by a third device. The second message includes second information allowing the third device to request third-modality data that includes third content that overlaps both the first content and the second content, with the third-modality data being configured to be presented using a third modality. The second information allows a third modality to synchronize with the first two modalities. For example, the first-modality data, the corresponding second-modality data, and the corresponding third-modality data may be synchronized by presenting each to the user in such a manner that the user may respond to the overlapping content using either the first modality, the second modality, or the third modality.

Process 1800 includes receiving another request at the first device (1880). The other request comes from a second requester and requests second first-modality data that includes fourth content. The second first-modality data is configured to be presented using the first modality. The other request may be from, for example, another user using a different device.

Process 1800 includes sending another message from the first device (1890). The other message is sent in response to receiving the other request, and is sent for receipt by another device. The other message includes third information that allows the other device to request second second-modality data that includes fifth content that overlaps the fourth content, with the second second-modality data being configured to be presented using the second modality. Thus, for example, two users may each be using separate mobile communication devices to navigate a network such as the WWW, and each user's modalities may be synchronized. That is, the first user may have his/her two modalities synchronized and the second user may have his/her two modalities synchronized, but there need not be any synchronization between the two users. The second first-modality data and the second corresponding second-modality data may be synchronized by presenting the second first-modality data and the second corresponding second-modality data to a second user in such a manner that the second user may respond to the overlapping content using either the first-modality or the second modality.

Process 1800 may be illustrated by various implementations including, for example, implementations of system 1500 or system 1700. In system 1500 or 1700, web server 1450 may receive a request for a VXML page from voice gateway 1420 (1810). Web server 1450 may send a message to browser 1416, with the message including the URL of the VXML page requested by voice gateway 1420 thereby allowing browser 1416 to request the corresponding HTML page (1820). Web server 1450 may use web server adaptor 1454, messaging handler 1470, and browser adaptor 1418 to send the message to browser 1416. If the URL of the VXML page is not the same as the URL of the corresponding HTML page, then web server 1450 may determine the URL of the corresponding HTML page and send the URL of the corresponding HTML page in the message rather than sending the URL of the VXML page (1830).

Web server 1450 may send the requested VXML page to voice gateway 1420 (1840). Web server 1450 may receive a request for the corresponding HTML page from browser 1416, possibly through firewall 1710 (1850). Web server 1450 may send the corresponding HTML page to browser 1416 (1860).

Web server 1450 may send a second message, with the second message going to a third-modality gateway (not shown) and including the URL of the VXML page, with the URL of the VXML page allowing the third-modality gateway to request corresponding third-modality data (1870).

Web server 1450 may receive another request, with the other request being from a second voice gateway (not shown) and requesting a second VXML page (1880). Web server 1450 may send another message for receipt by a second browser (not shown), with the other message including the URL of the second VXML page and thereby allowing the second browser to request a HTML page corresponding to the second VXML page (1890).

Web server 1450 may perform various operations of process 1800 using any of the server-push, browser-pull, voice-interrupt listener, or no-input tag implementations described earlier. In server-push, for example, a voice gateway requests a VXML page from a server (320; 1810), and the server sends a message to a browser indicating the corresponding HTML page (340-350; 1820). In browser-pull, for example, a voice gateway requests a VXML page from a server (410; 1810), and the server sends a response to a browser with an embedded command that updates the browser with the corresponding HTML page when the browser executes the embedded command (450; 1820). In voice-interrupt listener, for example, a browser requests a HTML page from a server (520; 1810), and the server sends a message to a voice gateway indicating the corresponding VXML page (540-550; 1820). In no-input tag, for example, a browser requests a HTML page from a server (620; 1810). The server has previously sent a no-input tag to a voice gateway allowing the voice gateway to request a JSP (610; 1820), and the server now updates the JSP with, for example, the address of the corresponding VXML page, thereby allowing the voice gateway to request the corresponding VXML page (640; 1820).

Various operations of process 1800 may also be performed by, for example, proxy or fused implementations. In a proxy implementation, for example, a synchronization controller receives a request for a HTML page from a browser (1110; 1810), and the synchronization controller sends a message to a voice gateway so that the voice gateway requests the corresponding VXML page (1140; 1820). In a fused implementation, for example, a synchronization controller receives a request for a HTML page from a browser (810; 1810), and the synchronization controller passes an identifier of the corresponding VXML page to a voice mode system (830; 1820).

Synchronizing Using Smart Adaptors

Figure 19:
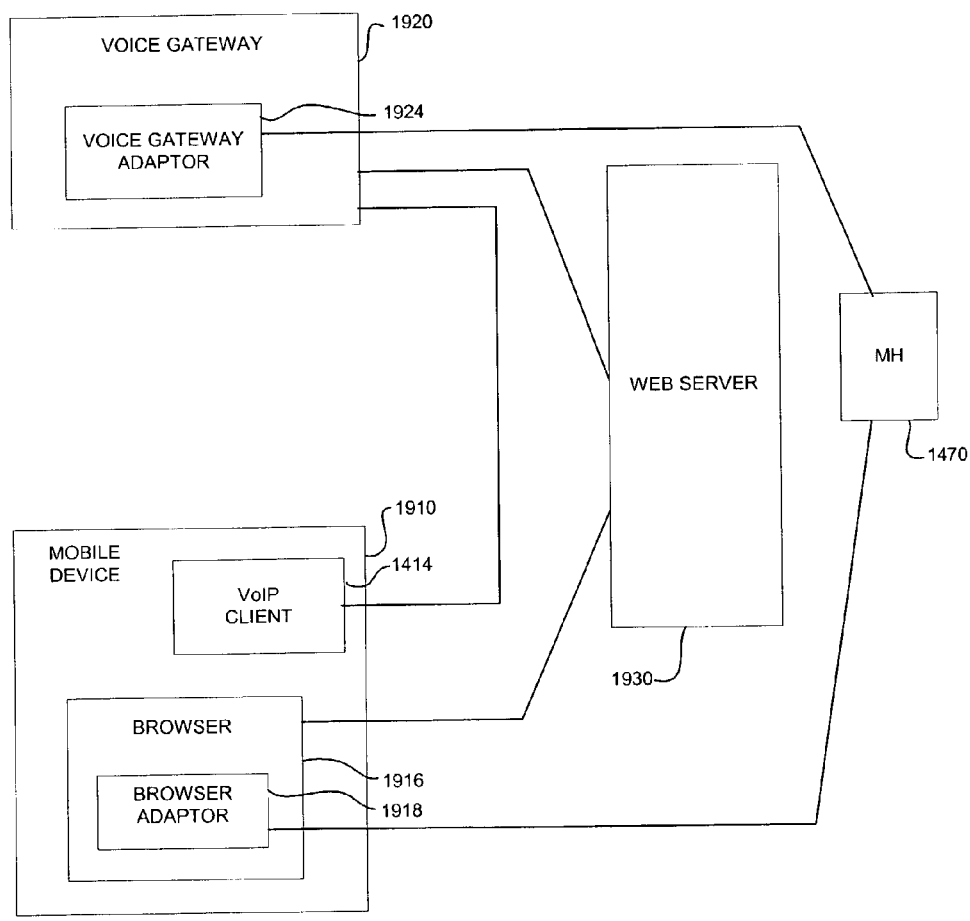
FIG. 19 is another example of a decentralized system.

Referring to FIG. 19, a system 1900 includes a modified mobile device 1910 that includes VoIP client 1414 and a modified browser 1916 having a modified browser adaptor 1918. System 1900 includes a modified voice gateway 1920 that is coupled to VoIP client 1414 and that includes modified voice gateway adaptor 1924. System 1900 includes a modified web server 1910 that does not include an adaptor and that is coupled to both browser 1916 and voice gateway 1920. System 1900 further includes messaging handler 1470 coupled to both browser adaptor 1918 and voice gateway adaptor 1924. Messaging handler 1470 does not communicate with web server 1910.

Browser 1916 and voice gateway 1920 are modified in that they can each send information to, and receive information from, browser adaptor 1918 and voice gateway adaptor 1924, respectively. Browser 1416 and voice gateway 1420, conversely, only receive information from browser adaptor 1418 and voice gateway adaptor 1424, respectively. As indicated above, web server 1930 is modified from web server 1450 in that web server 1930 does not include an adaptor nor include functionality associated with using an adaptor. Accordingly, web server 1930 does not publish messages.

Messages are published, as well as received, by voice gateway adaptor 1924 and browser adaptor 1918. More specifically, when browser 1916 receives input from a user requesting a HTML page, browser 1916 publishes (using browser adaptor 1918) a message to the unique messaging channel with the URL of the requested HTML page. Voice gateway adaptor 1924 receives the message and instructs voice gateway 1920 to request the corresponding VXML page from web server 1930. Referring again to process 1600, instead of the server publishing the URL to the voice gateway adaptor in operation 1675, browser adaptor 1918 publishes the URL. Analogously, when voice gateway 1920 receives input from VoIP client 1424 requesting a VXML page, voice gateway 1920 publishes (using voice gateway adaptor 1924) a message to the unique messaging channel with the URL of the requested VXML page. Browser adaptor 1918 receives the message and instructs browser 1916 to request the corresponding HTML page from web server 1930.

Browser adaptor 1918 and voice gateway adaptor 1924 may use the mechanisms described earlier to detect or obtain an IP address of mobile device 1910, or a user ID or device ID. Further, a login procedure may be used including, for example, a user entering login information into browser 1916 and voice gateway 1920 (using, for example, VoIP client 1414). Such login information may be used by web browser 1930 (or some other component(s)) to authenticate and uniquely identify the user. A login procedure may also be used with the earlier implementations described for systems 1500 and 1700.

System 1900 may be used to illustrate selected aspects of process 1800. In system 1900, mobile device 1910 may receive a request for a HTML page from a user (1810). Mobile device 1910 may send the URL of the requested HTML page to voice gateway 1920 in a message, with the URL allowing voice gateway 1920 to request the corresponding VXML page (1820). Mobile device 1910 may send the message using browser adaptor 1918, messaging handler 1470, and voice gateway adaptor 1924. Alternatively, in an implementation in which the URL for the HTML page is not the same as the URL for the corresponding VXML page, mobile device 1910 may determine the URL for the corresponding VXML page (1830) and send the URL for the corresponding VXML page in the message to voice gateway 1920. Mobile device 1910 may send a second message including the URL of the requested HTML page, with the second message going to a third-modality device and the sent URL allowing the third-modality device to request the corresponding third-modality data (1870).

In another example using system 1900, voice gateway 1920 may receive a request for a VXML page (1810). Voice gateway 1920 may send the URL of the requested VXML page to browser 1916 in a message, the URL allowing browser 1916 to request the corresponding HTML page (1820). Voice gateway 1920 may send the message using voice gateway adaptor 1924, messaging handler 1470, and browser adaptor 1918. Alternatively, in an implementation in which the URL for the HTML page is not the same as the URL for the corresponding VXML page, voice gateway 1920 may determine the URL for the corresponding HTML page (1830) and send the URL for the corresponding HTML page in the message to browser 1916. Voice gateway 1920 may send a second message including the URL of the requested VXML page, with the second message going to a third-modality device and the sent URL allowing the third-modality device to request the corresponding third-modality data (1870).

Figure 20:
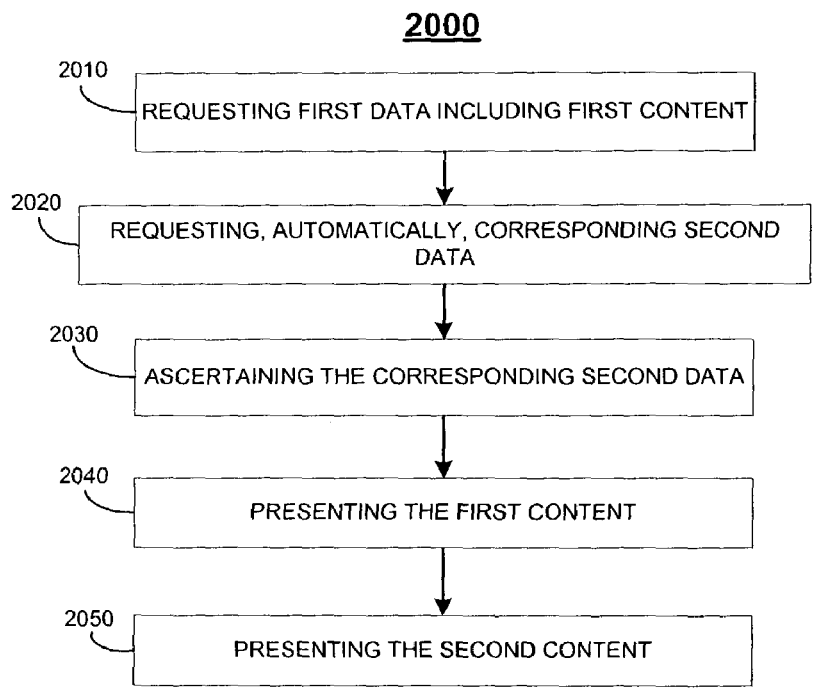
FIG. 20 is an example of a process for requesting synchronizing data.

Referring to FIG. 20, a process 2000 for requesting synchronizing data includes requesting first data for a first modality, with the first data including first content (2010). Process 2000 includes requesting, automatically after requesting the first data, corresponding second data for a second modality (2020). Corresponding second data includes second content that overlaps the first content, and the first modality may be synchronized with the second modality by presenting the first content and the second content to a user in such a manner that the user may respond to the overlapping content using either the first modality or the second modality.

Process 2000 includes ascertaining the corresponding second data (2030). The corresponding data may be ascertained by, for example, receiving information indicating the corresponding second data, or determining the corresponding second data based on the first data.

Process 2000 includes presenting the first content to a user using the first modality (2040) and presenting the second content to the user using the second modality (2050). The first content and the second content may be presented to the user in an overlapping time period in which the user may respond to the overlapping content using either the first modality or the second modality.

Process 2000 may be illustrated by, for example, system 1900. In system 1900, mobile device 1910 may request a VXML page (2010), the request being made to voice gateway 1920 using VoIP client 1414. Mobile device 1910 may thereafter automatically request the corresponding HTML page from web server 1930 (2020). Mobile device 1910 may receive the URL of the corresponding HTML page from voice gateway adaptor 1924 (2030), with the URL being received in a message at browser adaptor 1918. Mobile device 1910 may present the requested VXML page to a user using VoIP client 1414 and a speaker (2040), and may present the corresponding HTML page to the user using browser 1916 (2050).

Various operations of process 2000 may also be performed by, for example, proxy or fused implementations. In a proxy implementation, for example, a synchronization controller requests a HTML page from a web server (1120; 2010), and the synchronization controller requests the corresponding VXML page (1140; 2020). In a fused implementation, for example, a synchronization controller requests a HTML page from a web server (840; 2010), and the synchronization controller requesting the corresponding VXML page by passing an identifier of the corresponding VXML page to a voice mode system (830; 2020). More generally, in a fused implementation, for example, a device 730: (i) requests a HTML page (840; 2010), (ii) determines the corresponding VXML page (820; 2030), (iii) requests the corresponding VXML page (830; 2020), (iv) presents the requested HTML page after receiving the HTML page (see 850; 2040), and (v) presents the corresponding VXML page after accessing the VXML page (see 860; 2050).

Similarly, various operations of process 2000 may also be performed by one or more components in any of the server-push, browser-pull, voice-interrupt listener, or no-input tag implementations described earlier.

Figure 21:
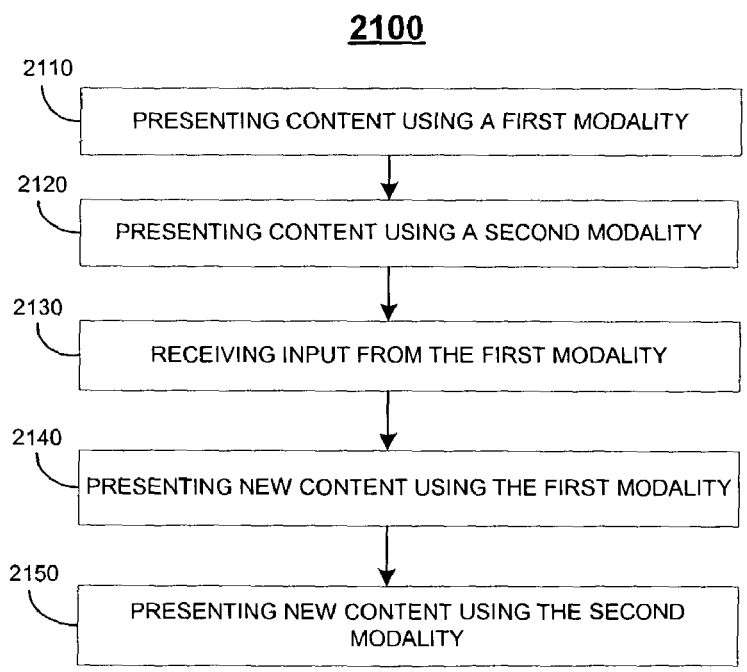
FIG. 21 is an example of a process for presenting updated data in different modalities.

Referring to FIG. 21, a process 2100 for presenting updated data in different modalities includes presenting content using a first modality (2110). Process 2100 also includes presenting the content using a second modality (2120) and receiving input in response to presenting the content, with the input being received from the first modality (2130). Process 2100 includes automatically presenting new content using the first modality in response to receiving the input, with the new content being determined based on the received input (2140). The new content is automatically presented using the second modality in response to receiving the input from the first modality (2150).

The above description of the operations in process 2100 use the term "content" in a slightly different manner than the description of the operations in processes 1800 and 2000. "Content" still generally refers to information that is presented to a user or that a user may be seeking, for example, the information that is displayed from a web page. However, process 2100 refers merely to the overlapping content that is presented by both modalities.

Implementations of each of the various devices, mobile or otherwise, may be used to illustrate process 2100. For example, considering system 1900, (i) mobile device 1910 may present a HTML page (2110), (ii) browser 1916 may inform voice gateway 1920 of the presented HTML page, (iii) voice gateway 1920 may request a corresponding VXML page, (iv) mobile device 1910 may present the corresponding VXML page (2120), (v) mobile device 1910 may receive a stylus input at browser 1916 requesting a new HTML page (2130), (vi) mobile device 1910 may present the new HTML page (2140), (vii) browser 1916 may inform voice gateway 1920 of the presented new HTML page, (viii) voice gateway 1920 may request the corresponding new VXML page, and (ix) mobile device 1910 may present the corresponding VXML page (2150).

Additional Implementations and Variations

Referring again to system 1400 of FIG. 14, implementations may include multiple mobile devices 1410 and 1430, multiple voice gateways 1420 and 1440, and/or multiple web servers 1450 and 1460, as shown. Implementations may also include multiple messaging handlers. Further, the coupling between components may vary depending on the implementation. For example, a voice gateway may support multiple mobile devices (and users), a messaging handler may be dedicated to a subset of components, and web servers and other components may have direct connections (physical or logical) to other components or may share a bus or other communication medium. Communication media may include, for example, wired, wireless, optical, and other media.

Implementations may also include having multiple users interact with one or more synchronized modalities, and the modalities may present information at a single device or at different devices. In one implementation, two users are remote to each other and are using different devices, with each device supporting at least one modality (possibly the same on each device). Either user can respond to the information presented at the user's one or more respective devices, and thereby modify the information that is subsequently presented at both users' devices. In another implementation, one of the users does not have the capability or authorization to respond to the presented data, but can observe or monitor the data. Such an implementation may be useful where the observing user is a supervisor and the other user is an employee, or where the observing user is a trainee and the other user is a trainer (or vice versa). In another implementation, each user has a different modality, allowing, for example, a supervisor or trainer to respond to data using only voice and the employee or trainee to respond using only a browser interface.

The mobile devices 1410 and 1430, or other devices, need not use a VoIP client 1414 and 1434 to communicate with a voice gateway. In one implementation, a device performs feature extraction on the device and communicates the resulting data to a voice gateway. The feature extraction may be performed by one or more components constituting a feature extraction unit. The communicated data may be communicated over an IP connection, an HTTP connection, or otherwise, and the voice gateway may perform a recognition process using an appropriate grammar. By performing the feature extraction, rather than transmitting the voice directly, the device reduces the required bandwidth between the device and the voice gateway, and accordingly this implementation can be used effectively with lower-bandwidth communication links.

Referring again to system 1700 of FIG. 17, in various implementations the function of firewall 1710 may be performed by, for example, a proxy, a gateway, or another intermediary. Implementations may use multiple intermediaries in various configurations.

An implementation may include any number of modalities, and the number of modalities may be, for example, fixed, variable but determined, or variable and unknown. The number of modalities may be fixed beforehand in a system, for example, that is specifically designed to support mobile devices communicating with a browser and voice and using two modalities. The number of modalities may also be variable but determined during an initial connection or power-up by a mobile device by, for example, having the system query a user for the number of modalities to be used.

The number of modalities may also be variable and unknown. For example, each modality gateway that is connected or powered-up may detect the IP address or user ID and subscribe to the unique messaging channel on the appropriate messaging handler. After subscribing, each modality gateway may receive all messages published, with each message (i) indicating, for example, that one of the modalities has been provided with new data, and (ii) providing information allowing the other modalities to synchronize. In an implementation in which a server publishes the messages, as each modality gateway synchronizes, the new session may be associated with the unique messaging channel.

In implementations that include multiple servers, a first server may provide information to a second server, for example, to facilitate association of sessions. A server may be enabled to provide multi-modal synchronization service as well as standard single-modal service.

In implementations that include multiple messaging handlers, the components that publish the synchronizing messages may publish on all messaging handlers. Alternatively, the components that publish may communicate with each other to ensure that messages are published on all of the messaging handlers to which active modality gateways are subscribed.

The implementations and features described may be used to synchronize data that includes navigation commands and/or non-navigation commands. Providing corresponding data for non-navigation commands may include, for example, having a component enter text, change a preference, or provide a focus in another modality.

Examples of various modalities include voice, stylus, keyboard/keypad, buttons, mouse, and touch for input, and visual, auditory, haptic (including vibration), pressure, temperature, and smell for output. A first modality may be defined as including voice input and auditory output, and a second modality may be defined as including manual input and visual and auditory output. A modality may also be restricted to either input or output.

Interfaces for various modalities may include, for example, components that interact with a user directly or indirectly. Directly interacting components may include, for example and as previously described, a speaker. Indirectly interacting components may include, for example, a VoIP client that communicates with the speaker.

Various implementations perform one or more operations, functions, or features automatically. Automatic refers to being performed substantially without human intervention, that is, in a substantially non-interactive manner. Examples of automatic processes include a process that is started by a human user and then runs by itself, or perhaps requires periodic input from the user. Automatic implementations may use electronic, optic, mechanical, or other technologies.

As explained earlier, various actions described in this disclosure are intended to be construed broadly. For example, receiving may include accessing or intercepting. As another example, a device may consist of a single component or multiple components.

A number of implementations have been described. Nevertheless, it will be understood that various modifications may be made. For example, various operations in the disclosed processes may be performed in different orders or in parallel, and various features and components in the disclosed implementations may be combined, deleted, rearranged, or supplemented. Accordingly, other implementations are within the scope of the following claims.

What is claimed is:

1. A computer-implemented method of performing multi-modal synchronization, the method comprising:
    enabling, at a given point in time, a first-modality gateway and a second-modality gateway to output the same specific information from the same Uniform Resource Locator (URL) as both first-modality content and second-modality content, and to receive input to the output same specific information using either of the first-modality gateway and the second-modality gateway, further comprising:
        opening a first-modality session via a first connection from a first-modality program on a client device to the first-modality gateway;
        opening a second-modality session via a second connection from a second-modality program on the client device to the second-modality gateway on a server;
        acquiring a unique identifier of the client device by the first-modality gateway and the second-modality gateway;
        transmitting the unique identifier from the first-modality gateway to a synchronization handler;
        creating a unique messaging channel on a third connection, based upon the unique identifier at the synchronization handler; and
        subscribing the first-modality gateway and the second-modality program to the unique messaging channel at a synchronization handler based on the unique identifier; and
    automatically determining a first-modality version of a resource if the input is received using the second-modality gateway, and a second-modality version of the resource if the input is received using the first-modality gateway.

2. The method of claim 1 further including associating the first-modality session and the second-modality session with the unique messaging channel, at the server.

3. The method of claim 1 further including publishing an indication of the second-modality content to the first-modality gateway on the unique messaging channel.

4. The method of claim 3 wherein the indication is published on the unique messaging channel by the server.

5. The method of claim 3, further comprising requesting first-modality content corresponding to the second-modality content at the server from the first-modality gateway.

6. The method of claim 3, wherein the published indication includes the Uniform Resource Locator (URL).

7. The method of claim 6, wherein the URL points to a dummy page.

8. The method of claim 1, wherein the first-modality gateway or the second-modality gateway are a voice gateway or a web server.

9. The method of claim 1, wherein the first-modality program or a second-modality program are a voice client or a web browser.

10. The method of claim 1, wherein the unique identifier is a network address of the client device.

11. The method of claim 1, wherein the unique identifier is a user ID of the user operating the client device.

12. The method of claim 1, wherein the unique identifier is a hardware identifier of the client device.

13. The method of claim 1, wherein the unique identifier is a combination of a firewall network address and a network address of the client device.

14. A computer-implemented method of performing multi-modal synchronization, the method comprising:

enabling, at a given point in time, a first-modality gateway and a second-modality gateway to output the same specific information from the same Uniform Resource Locator (URL) as both first-modality content and second-modality content, and to receive input to the output same specific information using either of the first-modality gateway and the second-modality gateway, further comprising:

opening a first-modality session via a first connection from a first-modality program on a client device to the first-modality gateway;

opening a second-modality session via a second connection from a second-modality program on the client device to the second-modality gateway on a server;

acquiring a unique identifier of the client device by the first-modality gateway and the second-modality gateway;

transmitting the unique identifier from the first-modality gateway to a synchronization handler;

creating a unique messaging channel on a third connection, based upon the unique identifier at the synchronization handler;

subscribing the first-modality gateway and the second-modality program to the unique messaging channel at the synchronization handler based on the unique identifier;

associating the unique messaging channel with the second-modality session, at the server;

transmitting the second-modality content from the sewer to the second-modality program via the second connection;

publishing an indication of the second-modality content to the first-modality gateway on the unique messaging channel; and requesting the first-modality content corresponding to the second-modality content at the sewer from the first-modality gateway; and automatically determining a first-modality version of a resource if the input is received using the second-modality gateway, and a second-modality version of the resource if the input is received using the first-modality gateway.

15. The method of claim 14, wherein the first-modality is a voice modality.

16. The method of claim 14, wherein the first-modality connection is established using the International Telecommunications Union-T Recommendation H.323 (H.323) standard protocol or a Session Initiation Protocol (SIP).

17. The method of claim 14, wherein the unique identifier is an Internet Protocol (IP) address.

18. The method of claim 14, wherein acquiring the unique identifier further comprises pulling the unique identifier out of a connection header.

19. The method of claim 14, wherein acquiring the unique identifier further comprises querying the client device for the unique identifier.

20. The method of claim 14, wherein the second-modality content is a dummy page that does not include content.

21. The method of claim 14 wherein the second-modality content includes a web page.

22. The method of claim 14, wherein the server is a web server.

23. The method of claim 14, wherein the second-modality connection is established in response to a user entering the Uniform Resource Locator (URL) into the client device.

24. The method of claim 14, further comprising determining the first-modality content corresponding to the second-modality content, at the server.

25. The method of claim 14, wherein the client device is a mobile device.

26. The method of claim 14, further comprising:

requesting a response from the server, at the first-modality gateway; and transmitting the response from the server to the first-modality gateway.

27. A system for performing multi-modal synchronization, the system comprising:

a client device including a first-modality program and a second-modality program;

a first-modality gateway configured to:
open a first-modality session from the first-modality program via a first connection,
acquire a unique identifier of the client device, and
transmit the unique identifier;

a server including a second-modality gateway configured to:
open a second-modality session from the second-modality program to a second-modality gateway via a second connection;
acquire the unique identifier of the client device at the second-modality gateway; and
automatically determine a first-modality version of a resource if input is received using the second-modality gateway, and a second-modality version of the resource if the input is received using the first-modality gateway; and a synchronization handler configured to enable, at a given point in time, a first-modality gateway and a second-modality gateway to output the same specific information from the same Uniform Resource Locator as both first-modality content and second-modality content, and to receive the input to the output same specific information using either of the first-modality gateway and the second-modality gateway, by:
receiving the unique identifier from the first-modality gateway,
creating a unique messaging channel on a third connection, based upon the unique identifier handler, and
subscribing the first-modality gateway and the second-modality program to the unique messaging channel based on the unique identifier.

28. A computer program product tangibly embodied in a machine-readable storage medium, the computer program product for performing multi-modal synchronization, where the computer program product comprises instructions that, when read by a machine, operate to cause a data processing apparatus to:

enable, at a given point in time, a first-modality gateway and a second-modality gateway to output the same specific information from the same Uniform Resource Locator (URL) as both first-modality content and second-modality content, and to receive input to the output same specific information using either of the first-modality gateway and the second-modality gateway, by:
opening a first-modality session via a first connection from a first-modality program on a client device to the first-modality gateway;
opening a second-modality session via a second connection from a second-modality program on the client device to the second-modality gateway on a server;
acquiring a unique identifier of the client device by the first-modality gateway and the second-modality gateway;
transmitting the unique identifier from the first-modality gateway to a synchronization handler;
creating a unique messaging channel on a third connection, based upon the unique identifier at the synchronization handler; and
subscribing the first-modality gateway and the second-modality program to the unique messaging channel at a synchronization handler based on the unique identifier; and automatically determine a first-modality version of a resource if the input is received using the second-modality gateway, and a second-modality version of the resource if the input is received using the first-modality gateway.

* * * * *